US012787938B2

(12) United States Patent
Xia et al.

(10) Patent No.: US 12,787,938 B2
(45) Date of Patent: Nov. 10, 2026

(54) POWER-ASSISTED WORKING MACHINE AND MOWER

(71) Applicant: Nanjing Chervon Industry Co., Ltd., Nanjing (CN)

(72) Inventors: Yiwen Xia, Nanjing (CN); Yanqing Xu, Nanjing (CN); Yufei Ren, Nanjing (CN); Haishen Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 522 days.

(21) Appl. No.: 18/449,745

(22) Filed: Aug. 15, 2023

(65) Prior Publication Data

US 2024/0107950 A1 Apr. 4, 2024

Related U.S. Application Data

(63) Continuation-in-part of application No. 17/954,116, filed on Sep. 27, 2022.

(30) Foreign Application Priority Data

Sep. 29, 2022 (CN) ......................... 202211198880.9
Sep. 29, 2022 (CN) ......................... 202211198891.7
(Continued)

(51) Int. Cl.
*A01D 75/28* (2006.01)
*A01D 34/00* (2006.01)
(Continued)

(52) U.S. Cl.
CPC ........... *A01D 75/28* (2013.01); *A01D 34/006* (2013.01); *A01D 34/69* (2013.01); *A01D 34/78* (2013.01);
(Continued)

(58) Field of Classification Search
CPC .... A01D 34/69; A01D 34/6806; A01D 34/78; A01D 34/824; A01D 2034/6843;
(Continued)

(56) References Cited

U.S. PATENT DOCUMENTS 4,478,028 A 10/1984 Dawson, Jr.
11,690,319 B2 * 7/2023 Ferrell .................. A01D 34/67 56/10.8
(Continued)

FOREIGN PATENT DOCUMENTS

AU 2019101294 A4 12/2019
CN 1919677 A 2/2007
(Continued)

OTHER PUBLICATIONS

Machine translation of CN108025796.
(Continued)

*Primary Examiner* — Tinh T Dang
(74) *Attorney, Agent, or Firm* — Greenberg Traurig, LLP

(57) ABSTRACT

A power-assisted working machine and mower. The mower includes a body including a traveling assembly and a drive motor for driving the traveling assembly; a handle device connected to the body and including an operating member, where the operating member includes a grip for a user to hold; and a connecting rod connected to the body. The mower further includes a motor parameter detection device configured to detect at least one of the rotor position and the working current of the drive motor; an angle detection device configured to detect an angle of inclination of a workplane of the mower relative to a horizontal plane; and a controller configured to estimate thrust applied to the handle device according to the rotor position and/or the working current and the angle of inclination.

22 Claims, 20 Drawing Sheets

(30) Foreign Application Priority Data

| | | |
|---|---|---|
| Oct. 31, 2022 | (CN) | 202211344885.8 |
| Oct. 31, 2022 | (CN) | 202211345673.1 |
| Apr. 13, 2023 | (CN) | 202310392877.9 |

(51) Int. Cl.

| | |
|---|---|
| ***A01D 34/69*** | (2006.01) |
| ***A01D 34/78*** | (2006.01) |
| ***A01D 34/82*** | (2006.01) |
| ***A01D 101/00*** | (2006.01) |
| *B62B 5/00* | (2006.01) |
| *E01H 5/04* | (2006.01) |

(52) U.S. Cl.
CPC ........ *A01D 34/824* (2013.01); *A01D 2101/00* (2013.01); *B62B 5/0033* (2013.01); *E01H 5/04* (2013.01)

(58) Field of Classification Search
CPC . A01D 2101/00; H02J 7/0063; B62B 5/0033; E01H 5/04
See application file for complete search history.

(56) References Cited

U.S. PATENT DOCUMENTS

| | | | | |
|---|---|---|---|---|
| 2015/0066278 | A1* | 3/2015 | Katayama | B62B 5/0069 180/6.66 |
| 2016/0221595 | A1* | 8/2016 | Hane | B62B 5/04 |
| 2016/0324065 | A1 | 11/2016 | Smith et al. | |
| 2017/0001656 | A1 | 1/2017 | Katayama | |
| 2018/0194383 | A1* | 7/2018 | Gussen | B62B 5/02 |
| 2020/0156482 | A1 | 5/2020 | Savaresi | |
| 2020/0375102 | A1 | 12/2020 | Arendt | |
| 2021/0022293 | A1 | 1/2021 | Kaneko | |
| 2021/0155278 | A1* | 5/2021 | Raja | A61H 3/04 |
| 2021/0185912 | A1 | 6/2021 | Wilks | |
| 2022/0183920 | A1 | 6/2022 | Raja | |

FOREIGN PATENT DOCUMENTS

| | | | | | |
|---|---|---|---|---|---|
| CN | 101545407 | B | | 9/2009 | |
| CN | 105425788 | A | | 3/2016 | |
| CN | 106385982 | A | | 2/2017 | |
| CN | 108025796 | A | | 5/2018 | |
| CN | 108107891 | A | | 6/2018 | |
| CN | 108547247 | A | * | 9/2018 | E01H 5/04 |
| CN | 108657365 | A | | 10/2018 | |
| CN | 109983907 | A | | 7/2019 | |
| CN | 110022670 | A | | 7/2019 | |
| CN | 110114265 | | | 8/2019 | |
| CN | 111207758 | A | | 5/2020 | |
| CN | 112293035 | A | | 2/2021 | |
| CN | 112836289 | A | | 5/2021 | |
| CN | 113211502 | A | | 8/2021 | |
| CN | 112293034 | B | | 1/2022 | |
| CN | 112293036 | B | | 3/2022 | |
| CN | 215960698 | U | | 3/2022 | |
| CN | 112293030 | B | | 7/2022 | |
| CN | 115137266 | A | | 10/2022 | |
| CN | 113925392 | B | | 11/2022 | |
| CN | 114902856 | A | | 2/2024 | |
| CN | 114794996 | B | | 4/2024 | |
| DE | 102011114337 | A1 | | 3/2013 | |
| DE | 102013224885 | A1 | * | 6/2015 | B62B 5/067 |
| DE | 102018200769 | A1 | | 7/2019 | |
| EP | 1014942 | A1 | | 7/2000 | |
| EP | 3889003 | A1 | * | 10/2021 | B62B 9/00 |
| EP | 3987906 | A1 | | 4/2022 | |
| JP | 2002193105 | A | | 7/2002 | |
| JP | 2004113375 | A | | 4/2004 | |

OTHER PUBLICATIONS

Machine translation of CN108107891.
Machine translation of CN109983907.
Machine translation of CN112293030.
Machine translation of CN112293034.
Machine translation of CN112293035.
Machine translation of CN112293036.
Machine translation of CN113925392.
Machine translation of CN114794996.
Machine translation of CN114902856.
Machine translation of CN115137266.
Machine translation of CN215960698.
Machine translation of JP2002193105.
Machine translation of JP2004113375.
Extended European search report issued on European patent application No. 22197888.5, dated Mar. 29, 2023, 8 pages.
Final Office Action from U.S. Appl. No. 17/954,116, dated Jul. 23, 2026, 10 pp.

* cited by examiner

POWER-ASSISTED WORKING MACHINE AND MOWER

RELATED APPLICATION INFORMATION

This application is a continuation-in-part of U.S. application Ser. No. 17/954,116, filed on Sep. 27, 2022. This application also claims the benefit under 35 U.S.C. § 119(a) of Chinese Patent Application No. CN 202211198891.7, filed on Sep. 29, 2022, Chinese Patent Application No. CN 202211198880.9, filed on Sep. 29, 2022, Chinese Patent Application No. CN 202211345673.1, filed on Oct. 31, 2022, Chinese Patent Application No. CN 202211344885.8, filed on Oct. 31, 2022, and Chinese Patent Application No. CN 202310392877.9, filed on Apr. 13, 2023. All of these applications are incorporated herein by reference in their entirety.

BACKGROUND

A mower is generally a machine used by a user to mow lawns. In some relatively smart mowers, a pressure sensor can sense the thrust of the user so as to control the traveling speed of the mower according to the thrust. However, the sensing accuracy and installation position of the pressure sensor and a cooperation state between the pressure sensor and other components in the mower affect the accuracy of thrust detection, affecting the comfort of the user controlling the mower to travel.

In other methods, the pressure sensor is not used to directly measure the thrust, and more other types of sensors need to be used to detect parameters such as the acceleration or the angle of inclination relative to the horizontal plane in the current working environment of the mower, so as to indirectly obtain the thrust of the user.

SUMMARY

In one example, a power-assisted mower includes: a body including a traveling assembly and a drive motor for driving the traveling assembly; a handle device connected to the body and including an operating member, wherein the operating member includes a grip for a user to hold; a motor parameter detection device configured to detect at least one of a rotor position and a working current of the drive motor; an angle detection device configured to detect an angle of inclination of a workplane of the power-assisted mower relative to a horizontal plane; and a controller configured to estimate a push-pull force applied to the handle device according to the rotor position and/or the working current and the angle of inclination.

In one example, the controller is configured to determine a rotational speed of the motor according to the rotor position.

In one example, the controller is configured to establish a thrust observation model according to a current force balance relationship of the mower and use the rotational speed and the working current as input parameters of the thrust observation model to determine the push-pull force.

In one example, the force balance relationship includes at least the push-pull force, a driving force of the drive motor, resistance of the mower in a current working environment, and a resultant force applied to the mower.

In one example, the controller is configured to establish a relationship model between the working current, the rotational speed, and the resultant force according to the thrust observation model, determine the resultant force according to the working current and the rotational speed, and determine the push-pull force according to a difference between the resultant force and the resistance.

In one example, the resistance includes at least frictional resistance.

In one example, a coefficient of friction of the frictional resistance is configured not to change with movement of the mower.

In one example, the frictional resistance includes rolling friction and/or sliding friction.

In one example, a force balance relationship further includes a self-weight of the mower, and the self-weight is an average value of weights of the mower at different times.

In one example, the mower does not include a pressure sensor capable of detecting the push-pull force.

In one example, the motor parameter detection device includes a Hall sensor.

In one example, the controller is further configured to control a power-assisting state of the drive motor according to the push-pull force.

In one example, the angle detection device includes an attitude sensor.

In one example, the attitude sensor includes at least one of a gyroscope, an accelerometer, and a magnetometer.

In one example, a power-assisted garden tool includes: a body including a traveling assembly and a functional assembly; a handle device connected to the body and used for a user to operate the traveling assembly and/or the functional assembly to work; a drive motor configured to drive the traveling assembly; and a controller disposed on the body or the handle device and configured to control the drive motor to output a driving force. The traveling assembly includes at least drive wheels. The controller is configured to: acquire motion information of the drive wheels and identify, based on the motion information, an operating intention of the user operating the handle device; and control the drive motor to work according to the motion information and the operating intention to provide power for the garden tool.

In one example, a power-assisted working machine includes: a body including a traveling assembly and a drive motor for driving the traveling assembly; a handle device connected to the body and including an operating member, wherein the operating member includes a grip for a user to hold; a motor parameter detection device configured to detect a working parameter of the drive motor; an accelerometer configured to detect acceleration of the working machine in at least one direction in a current working environment; and a controller configured to determine an angle of inclination of the working machine relative to a horizontal plane according to the acceleration and estimate a push-pull force applied to the handle device according to the working parameter and the angle of inclination.

In one example, the working parameter includes at least one of a rotor position and a working current of the motor.

In one example, the controller is configured to determine a rotational speed of the motor according to a rotor position.

In one example, the working parameter includes rises a rotational speed and a working current of the motor.

In one example, the controller is configured to establish a thrust observation model according to a current force balance relationship of the power-assisted working machine and use a rotational speed and a working current as input parameters of the thrust observation model to determine the push-pull force.

In one example, a power-assisted working machine includes: a body including a traveling wheel set and a drive motor for driving the traveling wheel set; a handle device connected to the body and including a grip for a user to hold; at least one wheel speed detection device configured to detect a wheel speed of the traveling wheel set; an angle detection device configured to detect an angle of inclination of a workplane of the power-assisted working machine relative to a horizontal plane; and a controller configured to estimate, according to the wheel speed and the angle of inclination, a push-pull force applied to the handle device and adaptively adjust a power-assisting state of the drive motor according to the push-pull force.

In one example, a garden tool system includes a garden tool. The garden tool includes: a body including at least a traveling assembly; a handle device connected to the body and used for a user to operate the traveling assembly to work; a drive motor configured to drive the traveling assembly; and a controller configured to control a state in which the drive motor provides power assistance. The tool system further includes: a first detection device configured to detect a relative state between the garden tool and an operator; and a second detection device configured to detect a traveling state of the garden tool. The controller is configured to: control the state in which the drive motor provides the power assistance according to the relative state and the traveling state.

DETAILED DESCRIPTION

It is to be understood that a power-assisted working machine may be a mower, a snow thrower, a trolley, or another tool or device. In the present application, a push mower that can be operated by a user at the rear of the mower is used as an example for description.

Figure 1:
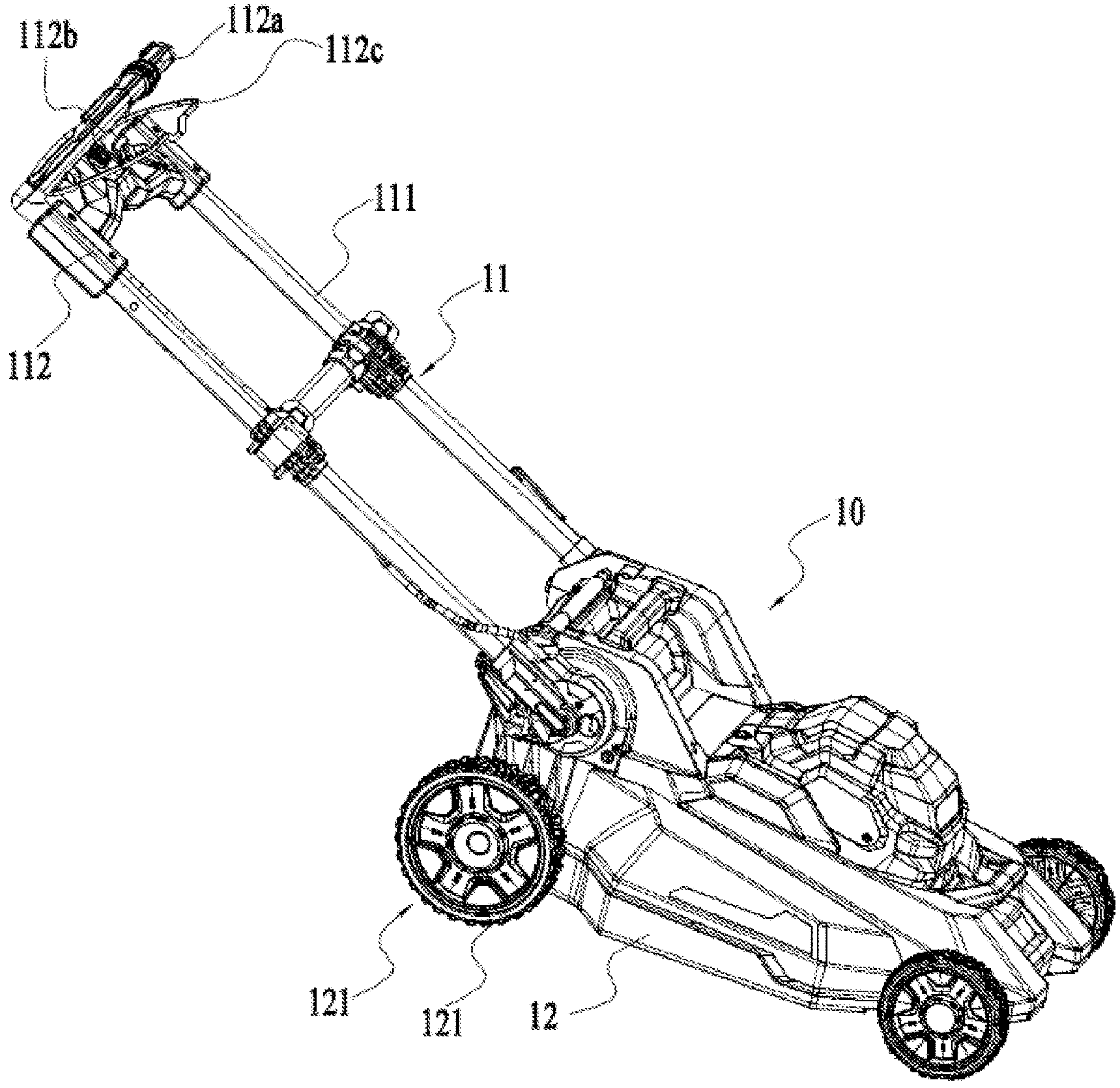
FIG. 1 is a perspective view of a power-assisted working machine.

Referring to FIG. 1, a mower 10 mainly includes a handle device 11, a connecting rod 111, an operating member 112, an operating switch 112*a*, and a body 12. The body 12 includes a traveling assembly 121. Optionally, the handle device 11 includes the connecting rod 111 and the operating member 112 that can be held. The operating member 112 includes a grip for the user to hold and the operating switch 112*a*, the connecting rod 111 is a hollow long rod structure, and the connecting rod 111 connects the operating member 112 to the body 12. The traveling assembly 121 is mounted onto the body 12 and can rotate around a rotating shaft so that the entire mower 10 can move on the ground. In this example, the traveling assembly 121 includes traveling wheels 1211 and a power mechanism for driving the traveling wheels 1211 to travel.

In this example, the mower 10 has a self-traveling control function. The power mechanism can drive the traveling assembly 121 to rotate to drive the mower 10 to move on the ground so that the user does not need to manually push the mower 10 to move. Specifically, the power mechanism may be a drive motor 122 which can output a driving force for driving the traveling assembly 121 to rotate. In some examples, the handle device 11 of the mower 10 is further integrated with a power button 112*b* and a trigger 112*c*. For example, the power button 112*b*, the trigger 112*c*, and the operating switch 112*a* of the mower 10 are all integrated on the operating member 112. In addition, the operating switch 112*a* is not limited to a physical switch or a signal switch, and any device that can control the current in a circuit to be on or off is applicable. In fact, this type of operating switch 112*a* is not limited to current control and may also control the self-traveling function to be enabled or disabled by mechanical means.

Generally, to sense the thrust of the user to control the relevant parameter in the traveling process of the mower, such as the traveling speed or output torque, a pressure sensor and a trigger assembly for triggering the pressure sensor are disposed in the handle device 11. In an example, the trigger assembly can drive the pressure sensor to deform. In this manner, when the user applies the thrust to a grip 115, the trigger assembly applies a force to the pressure sensor, and the pressure sensor deforms and generates an electrical signal. In an example, the mower 10 may further include a signal processing device and a control unit, where the electrical signal generated by the pressure sensor is sent to the signal processing device, the signal processing device sends the processed signal to the control unit, and the control unit controls the mower 10 to travel on the ground. However, the electrical signal outputted by the pressure sensor can be transmitted to the body 12 only through a relatively long communication link; in addition, to accurately sense the thrust of the user, the accuracy of the pressure sensor is required to be relatively high, and after used for a relatively long time, the pressure sensor may have reduced sensitivity for sensing deformation. To sum up, the manner of using the pressure sensor to sense the thrust of the user has a problem of unstable performance or reduced accuracy, affecting the comfort of the user following the mower 10 and controlling the mower 10 to work.

There are some methods in the existing art for estimating the thrust applied by the user to the handle device 11 of the mower 10 without using the pressure sensor. For example, the current and acceleration of the drive motor or the angle of inclination of the workplane of the mower relative to the horizontal plane and other parameters are detected, and the thrust applied by the user to the handle can be obtained after a comprehensive analysis. Although the pressure sensor is not required, some other detection devices are inevitably added due to the detection of parameters such as the acceleration or angle of inclination, and it cannot be ensured that the thrust estimation is not affected by the installation positions of the detection devices.

In a working machine without the pressure sensor, to reduce the types of detection devices and ensure the accuracy of the estimation result, the thrust of the user may be estimated by using parameters in a traveling control system of the mower.

Figure 2:
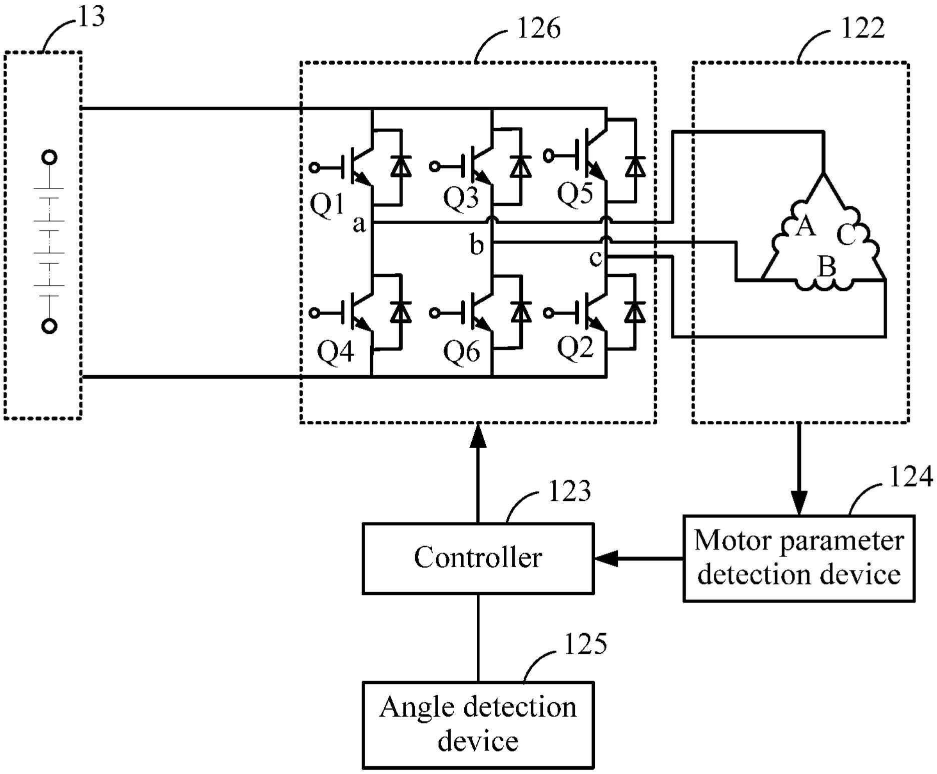
FIG. 2 is a control logic diagram of the power-assisted working machine in FIG. 1.

In this example, as shown in the control logic diagram of FIG. 2, in addition to the drive motor 122 and a controller 123, a control circuit of the body 12 of the mower 10 may further include a motor parameter detection device 124 that can acquire relevant parameters in the traveling process of the mower and can detect the rotor position of the drive motor 122 and/or the working current, that is, the phase current, of the motor and an angle detection device 125 that can detect the angle of inclination of the current workplane of the mower 10 relative to the horizontal plane. The control circuit further includes at least a power supply 13 and a driver circuit 126.

The power supply 13 may be a battery pack or alternating current mains power. Specifically, the power supply voltage may be converted by a power conversion circuit to power on the controller 123, the motor parameter detection device 124, and the angle detection device 125.

The driver circuit 126 can be connected between the controller 123 and the drive motor 122 and includes several semiconductor switching elements for switching an energized state of an electric motor. In an example, the driver circuit 126 is electrically connected to the stator windings of phases of the drive motor 122 and used for transmitting the power supply current to the stator windings to drive the brushless motor 122 to rotate. As an example, as shown in FIG. 2, the driver circuit 126 includes multiple switching elements Q1, Q2, Q3, Q4, Q5, and Q6. Gate terminals of the switching elements are electrically connected to the controller 123 and are used for receiving control signals from the controller 123. Drains or sources of the switching elements are connected to the stator windings of the drive motor 122. The switching elements Q1 to Q6 receive the control signals from the controller 123 to change respective conduction states, thereby changing the current loaded on the stator windings of the drive motor 122 by the power supply. In an example, the switching elements Q1 to Q6 in the driver circuit 126 may be a three-phase bridge driver circuit including six controllable semiconductor power devices (such as field-effect transistors (FETs), bipolar junction transistors (BJTs), and insulated-gate bipolar transistors (IGBTs)) or any other types of solid-state switches (such as the IGBTs and the BJTs).

In an example, the motor parameter detection device 124 may be a Hall sensor and can directly acquire the rotor position of the drive motor 122. In an example, the motor parameter detection device 124 may be a sampling resistor and can detect the phase current of the motor. In an example, the motor parameter detection device 124 may also be a device for inducing the motor current through a magnetic field. In an example, when estimating the thrust applied by the user to the handle device, the controller 123 may use one of the rotor position or the phase current or may use both the two parameters.

Figure 3:
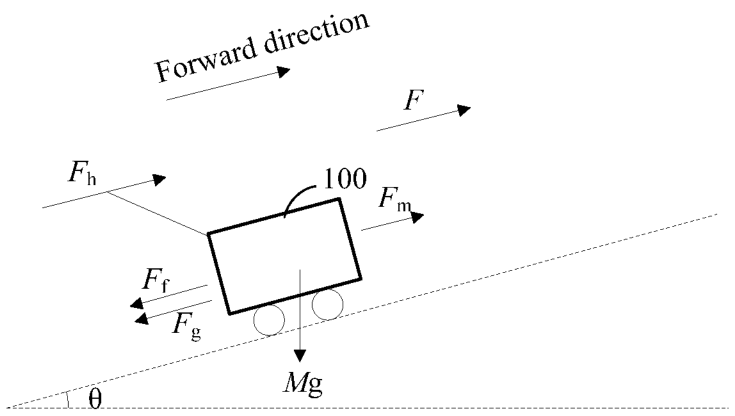
FIG. 3 is a schematic diagram illustrating the force analysis of a power-assisted working machine in an example of the present application.

The angle detection device 125 is used for detecting the angle of inclination of a plane on which the mower 10 travels relative to the horizontal plane, for example, the angle θ shown in FIG. 3. In an example, the angle detection device 125 may be an attitude sensor. The attitude sensor may be formed by a gyroscope, an accelerometer, and a magnetometer that can separately measure three attitude angles of the mower 10 in the body coordinate system and the ground coordinate system, that is, the yaw angle, the pitch angle, and the roll angle. Further, the controller 123 can determine the angle of inclination θ according to the preceding three attitude angles.

To facilitate the understanding of the principle of the controller 123 estimating the thrust of the user, we may perform a force analysis at any point on the mower 10. As shown in FIG. 3, the thrust applied by the hand to the mower is $F_h$, the driving force of the motor generated by the drive motor 122 is $F_m$, the frictional force applied to the traveling wheel of the mower 10 is $F_f$, the component of gravity that hinders the advancement of the mower 10 is $F_g$, and the resultant force applied to the mower 10 in a forward direction is F. Therefore, all forces applied to the mower 10 at any moment satisfy the following force balance relationship: $F_h+F_m+F_f+F_g=F$. The rolling friction of the traveling wheel satisfies $F_f=-k_b\omega$, the component of gravity satisfies $F_g=Mg\sin\theta$, and the resultant force satisfies F=Ma. a denotes the acceleration of the mower 10 in the forward direction, M denotes the weight of the mower, and $k_b$ denotes the coefficient of friction. The components of the frictional force and gravity may be collectively referred to as the resistance of the mower in the current working environment. To sum up, the force balance relationship of the mower is described below.

$$F_h + F_m - k_b\omega - Mg\sin\theta = Ma \tag{1}$$

In this example, neither the sliding friction nor the change in the coefficient of rolling friction is considered. In addition, as the mowing is performed, the weight of a grass collecting device of the mower increases and the weight M of the mower also increases. In this example, the average value of the weight of the mower at different times may be used as the weight M and substituted into the preceding force balance relationship. The controller 123 may establish a thrust observation module according to the preceding force balance relationship and input the parameters detected by the motor parameter detection device 124 as input parameters into the preceding thrust observation model, so as to determine the thrust $F_h$ of the user. The thrust observation model may be established by using different model establishment strategies, which is not limited in this example.

In an example, the controller 123 may determine the rotational speed of the drive motor 122 according to the rotor position of the motor or determine the rotational speed of the motor according to the phase current. Further, the controller 123 may input the rotational speed of the motor and the working current as the input parameters into the thrust observation model to calculate the magnitude of the thrust.

In an example, the controller 123 may establish the relationship model between the working current, that is, the phase current, of the motor, the rotational speed, and the resultant force of the mower according to the preceding thrust observation model, then determine the resultant force according to the working current and the rotational speed, and determine the thrust according to the difference between the resultant force and the resistance. When the thrust observation model is established, the observation model between the resultant force, the speed of the motor, and the phase current may be established by using the relationship between the rotational speed of the motor and the acceleration and the relationship between the rolling friction and the speed of the motor. In an example, the relationship model between the phase current, the rotational speed, and the resultant force of the mower determined according to the thrust observation model is $\dot{n}=a1n+b1i+c1F$, where n denotes the rotational speed of the motor, i denotes the working current of the motor, and a1, b1, and c1 are coefficients determined by the system parameters and environmental parameters of the mower. The controller 123 may determine the resultant force F of the mower according to the rotational speed of the motor and the working current, or the controller 123 may determine the rotational speed according to the working current and then determine the resultant force F in conjunction with the working current. Further, the thrust $F_h=F-F_g$ may be determined.

When controlling the drive motor to rotate, the traveling control system of the mower needs to detect the rotor position or phase current of the motor and calculate the thrust of the user by establishing the thrust observation model and using the preceding rotor position and phase current so that the thrust of the user can be calculated without adding other detection devices or elements. In addition, since the control technology of the traveling control system of the mower is relatively mature, the accuracy of the parameters detected in the system can be ensured, thereby ensuring the accuracy of the thrust estimation.

In the process of establishing the thrust observation model and using the rotor position and phase current to calculate the thrust of the user, to detect the angle of inclination θ, the attitude sensor is generally used. The attitude sensor includes three instruments: the gyroscope, the accelerometer, and the magnetometer, and the angle of inclination θ is calculated by detecting three angles. Many instruments are used, many parameters need to be detected, and the calculation process of the angle of inclination is complicated.

Figure 4:
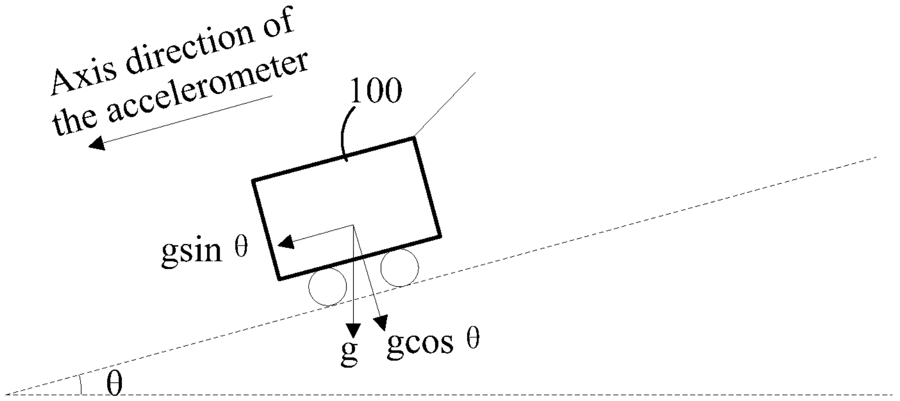
FIG. 4 is a schematic diagram illustrating the acceleration analysis of a power-assisted working machine in an example of the present application.

In an example, to obtain the angle of inclination θ simply, quickly, and accurately, in the present application, the acceleration of the mower on the workplane is analyzed. As shown in FIG. 4, the acceleration $a_z$ of the mower 10 in the forward direction is equal to the sum of the forward acceleration a of the mower and the component g sin θ of the gravitational acceleration in the forward direction of the mower, that is, $a_z=a+g\sin\theta$. The forward acceleration of the mower satisfies $$a = \dot{v} = r\dot{\omega} = r\frac{\dot{\omega}_m}{G_m} = r\frac{\frac{2\pi\dot{n}}{60}}{G_m} = \frac{\pi r\dot{n}}{30G_m},$$

where v denotes the wheel speed, r denotes the radius of the wheel, ω denotes the angular velocity of the wheel, $\omega_m$ denotes the angular velocity of the drive motor, $G_m$ denotes the speed ratio, and n denotes the rotational speed of the motor. The controller 123 may determine the rotational speed n of the motor according to the rotor position and/or the phase current of the preceding drive motor so that the forward acceleration a of the mower can be determined.

Since the axis direction of the accelerometer is parallel to the forward direction of the mower, the acceleration $a_z$ of the mower in the forward direction is measured using the axis direction of the accelerometer. On different traveling surfaces, such as the flat ground, the downhill, and the uphill, the relationship between $a_z$ and a may be expressed below.

$$\begin{cases} \text{Flat ground } a_z = a \\ \text{Downhill } a_z = a + g\sin\theta \\ \text{Uphill } a_z = a - g\sin\theta \end{cases} \tag{2}$$

It can be seen from the above that the angle of inclination θ can be calculated only by determining the acceleration $a_z$ of the mower in the forward direction. In this example, the acceleration $a_z$ of the mower in the forward direction may be measured using the accelerometer. Therefore, the angle of inclination $$\theta = \arcsin\frac{a - a_z}{g}$$

can be determined.

In an example, the angle of inclination θ is also correlated to the acceleration $a_y$ in a direction perpendicular to the forward direction of the mower. In this example, on different traveling surfaces, such as the flat ground, the downhill, and the uphill, the relationship between $a_z$ and a may be expressed below.

$$\begin{cases} \text{Flat ground } a_z = a \\ \text{Downhill } a_z = a + g\sin\theta\text{, that is, } a_z > a \\ \text{Uphill } a_z = a - g\sin\theta\text{, that is, } a_z < a \end{cases} \quad (3)$$

It can be seen from the above that the relationships between $a_z$ and a are different on different traveling surfaces, and the relationship between $a_y$ and the angle of inclination θ is $a_y$=g cos θ, which is fixed, so the calculation method in which θ is calculated using the relationship between $a_y$ and the angle of inclination θ and θ on different traveling surfaces is determined using the different relationships between $a_z$ and a is described below.

$$\theta = \begin{cases} -\arccos\frac{a_y}{g} & a_z \geq a \\ \arccos\frac{a_y}{g} & a_z < a \end{cases} \quad (4)$$

In this example, the acceleration $a_z$ of the mower in the forward direction and the acceleration $a_y$ in a direction perpendicular to the forward direction of the mower are measured using the accelerometer so that the angle of inclination θ is determined.

In this example, high-cost and high-demand detection devices such as an acceleration sensor and an attitude sensor do not need to be provided, and the thrust of the user can be accurately estimated just by means of the accelerometer and the commonly used detection parameters in the traveling control system, that is, the rotor position and/or the phase current. While the costs are reduced, the accuracy of the thrust estimation is ensured.

The speed needs to be controlled according to the torque through the integration of time, resulting in a lag of the response in speed. Thus, the user feels pulled or hindered and has relatively low comfort. However, in the example of the present application, after the thrust of the user is estimated, based on the preceding force balance relationship, the driving force of the motor may be changed, that is, the output torque of the motor may be changed. Therefore, the driving force may change in real time in response to the change of the thrust so that a self-traveling control process is smoother and the user feels more comfortable.

In this example, the process of the controller 123 changing the output torque of the motor in response to the thrust of the user may be applied to field-oriented control (FOC) or brushless direct current (BLDC) control or a combination of the two.

Figure 5:
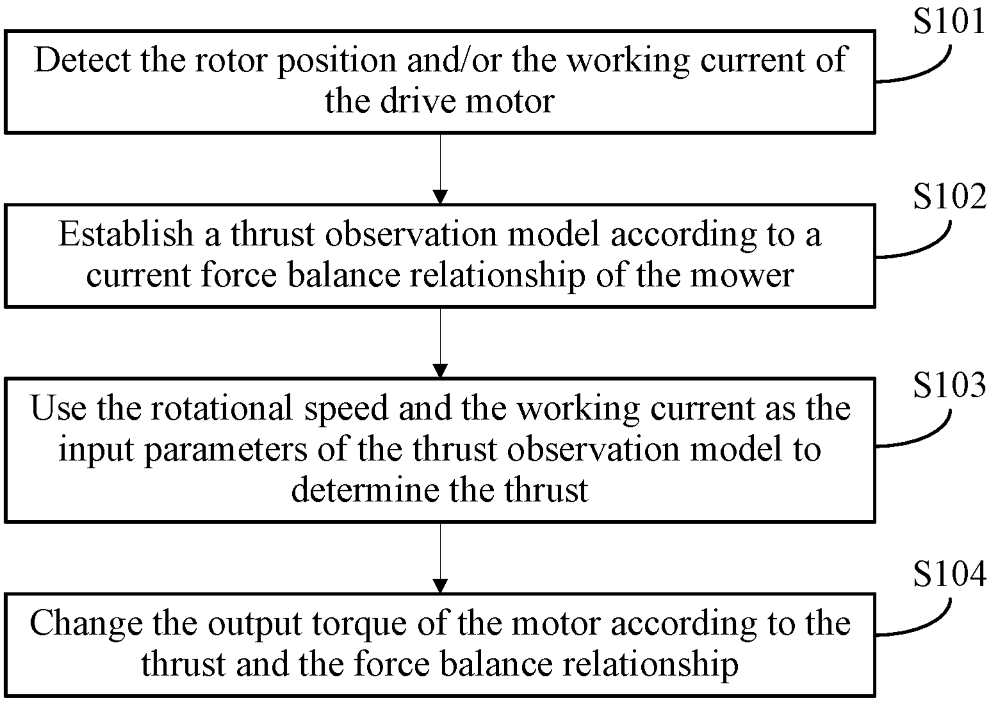
FIG. 5 is a flowchart of a whole machine control method of the power-assisted working machine in FIG. 1.

Referring to FIG. 5, a traveling control method of a walk-behind mower includes the steps described below.

In S101, the rotor position and/or the working current of the drive motor are detected.

In an example, the rotational speed of the motor may be determined according to the rotor position and/or the working current of the motor.

In S102, a thrust observation model is established according to a current force balance relationship of the mower.

In S103, the rotational speed and the working current are used as the input parameters of the thrust observation model so as to determine the thrust.

It is to be understood that the resultant force may be obtained by inputting the rotational speed and working current into the thrust observation model as the input parameters, and further, the value of the thrust $F_h$ may be determined according to the relationship $F_h$=F−$F_f$−$F_g$ between the resultant force, the thrust, and the resistance.

In S104, the output torque of the motor is changed according to the thrust and the force balance relationship.

Figure 6:
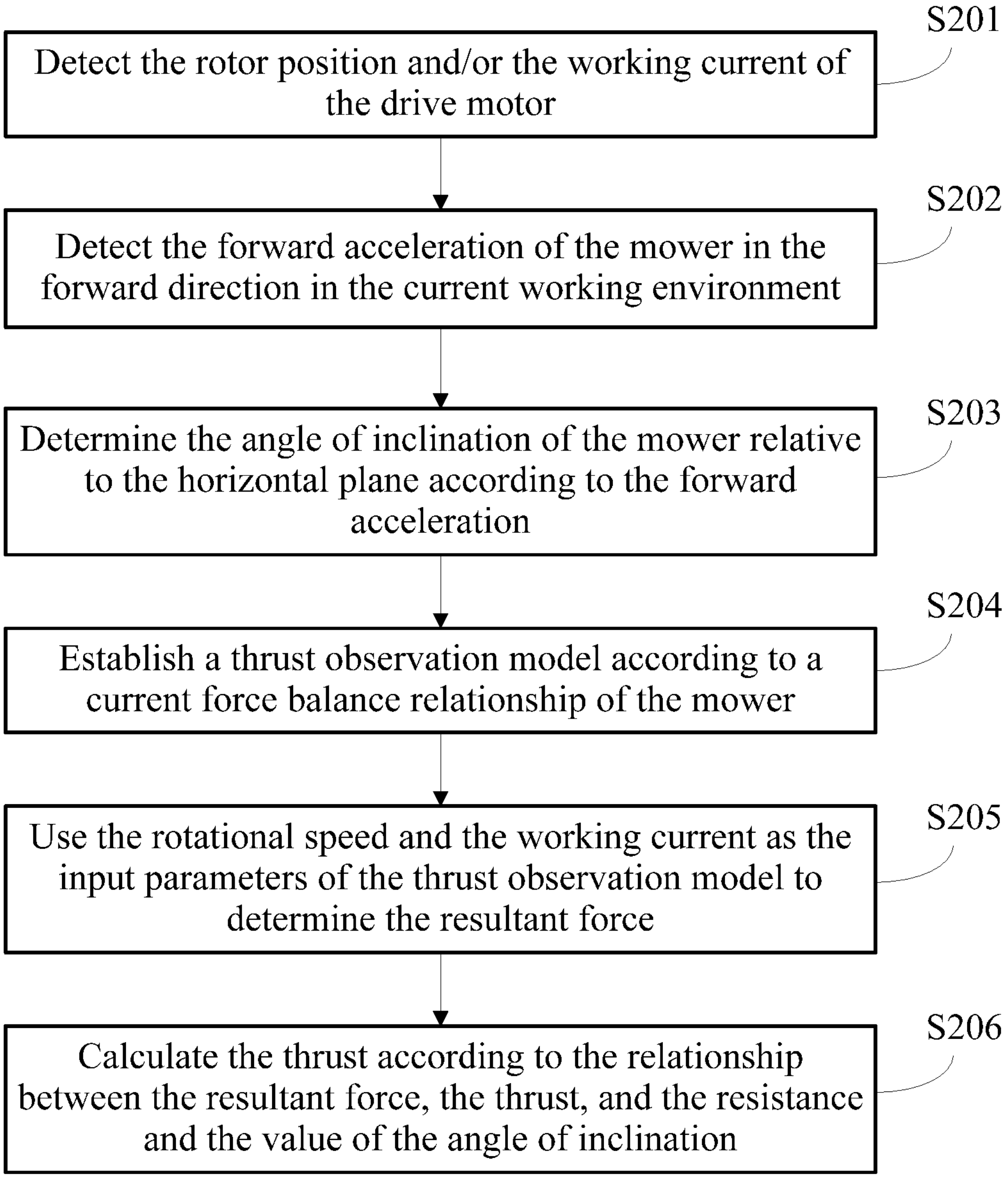
FIG. 6 is a flowchart of a whole machine control method of the power-assisted working machine in FIG. 1.

Referring to FIG. 6, the traveling control method of the walk-behind mower includes the steps described below.

In S201, the rotor position and/or the working current of the drive motor are detected.

In an example, the rotational speed of the motor may be determined according to the rotor position and/or the working current of the motor.

In S202, the acceleration of the mower in at least one direction in the current working environment is detected.

In S203, the angle of inclination of the mower relative to the horizontal plane is determined according to the acceleration.

In S204, a thrust observation model is established according to a current force balance relationship of the mower.

In S205, the rotational speed and the working current are used as the input parameters of the thrust observation model so as to determine the resultant force.

In S206, the thrust is calculated according to the relationship between the resultant force, the thrust, and the resistance and the value of the angle of inclination.

It is to be understood that the resultant force may be obtained by inputting the rotational speed and working current into the thrust observation model as the input parameters, and further, the value of the thrust $F_h$ may be determined according to the relationship $F_h$=F−$F_g$ between the resultant force, the thrust, and the resistance.

In S207, the output torque of the motor is changed according to the thrust and the force balance relationship.

In the preceding example, the force balance relationship of the mower is:

$$F_h + F_m - k_b\omega - Mg\sin\theta = Ma, \quad (5)$$

where $$a = \dot{v} = r\dot{\omega} = r\frac{\dot{\omega}_m}{G_m} = r\frac{\frac{2\pi\dot{n}}{60}}{G_m} = \frac{\pi r\dot{n}}{30G_m},$$

v denotes the wheel speed, r denotes the wheel radius, ω denotes the angular velocity of the wheel, $\omega_m$ denotes the angular velocity of the drive motor, $G_m$ denotes the speed ratio, and n denotes the rotational speed of the motor. In the process of determining the thrust of the user according to the preceding balance relationship, to determine the forward acceleration a of the mower, the rotational speed n of the motor may be determined according to the rotor position and/or the phase current of the drive motor or the rotational speed n of the motor is directly detected. However, in practical applications, if a clutch structure is mounted on the mower, when the clutch is disengaged, the rotational speed v of the wheel cannot be determined by the rotational speed n of the motor, the forward acceleration a of the mower cannot be determined, and the thrust of the user cannot be determined using the force balance relationship.

To avoid the preceding case, the rotational speed of the wheel may be directly collected so as to establish the force balance relationship of the mower to acquire the thrust of the user. For example, a wheel speed detection device may be used to detect the rotational speed of the wheel.

Figure 7:
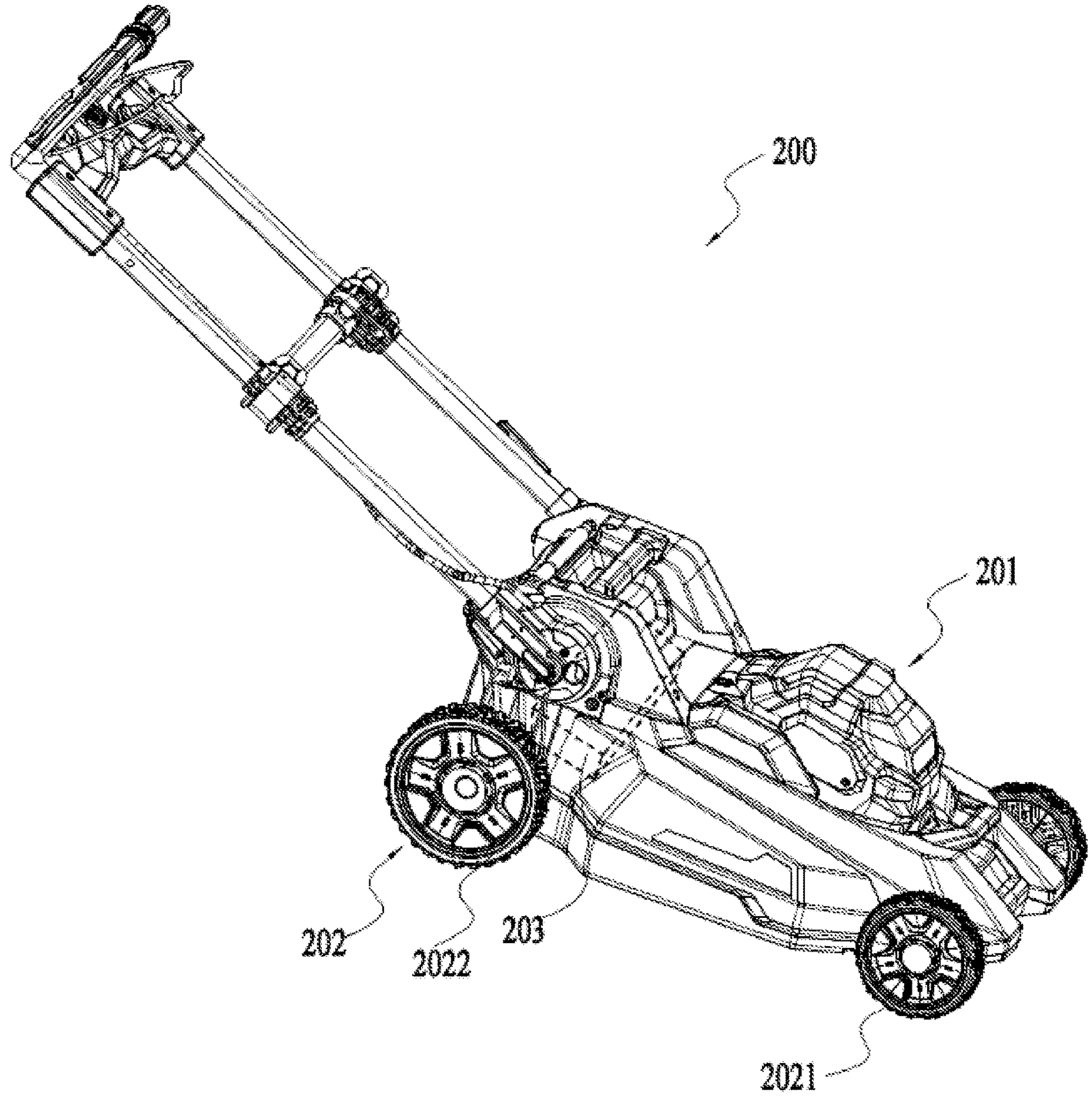
FIG. 7 is a perspective view of a power-assisted mower.

In an example, a mower 200 as shown in FIG. 7 includes a mower body 201, a traveling wheel set 202, and a drive motor 203 for driving the traveling wheel set 202 to travel. The drive motor 203 may drive the traveling wheel set 202 to travel through a gearbox 204. The traveling wheel set 202 may include front wheels 2021 and rear wheels 2022, where the front wheels 2021 can be driven by the drive motor 203, and the rear wheels 2022 can also be driven by the drive motor 203, that is to say, the front wheels 2021 or the rear wheels 2022 may all be drive wheels. In this example, the dimension of the front wheels 2021 may be the same as or different from the dimension of the rear wheels 2022, the angular velocity of the front wheels is the same as the angular velocity of the rear wheels, and the wheel speed in the present application refers to the angular velocity $\omega$ of the front wheels or the rear wheels.

In this example, a controller 206 may establish the thrust observation module according to the preceding force balance relationship and input the wheel speed of the traveling wheel set 202 as the input parameter into the preceding thrust observation model to determine the thrust $F_h$ of the user. For example, the controller 206 may input the wheel speed of the traveling wheel set 202 and the working current of the drive motor 203 as the input parameters into the thrust observation model to calculate the magnitude of the thrust. During the establishment of the thrust observation model, the observation model of the resultant force, the wheel speed, and the phase current is established using the relationship between the wheel speed $\omega$ and the acceleration a and the relationship between the rolling friction and the wheel speed $\omega$. In an example, the relationship model between the phase current, the wheel speed, and the resultant force of the mower determined according to the thrust observation model is $\dot{\omega}=-a_2\omega+b_2 i+c_2 F$, where n denotes the rotational speed of the motor, i denotes the working current of the motor, and $a_2$, $b_2$, and $c_2$ are coefficients determined by the system parameters and environmental parameters of the mower. The controller 206 may determine the resultant force F of the mower according to the wheel speed of the traveling wheel set 202 and the working current of the drive motor. Further, the thrust $F_h=F-F_g$ may be determined.

In this example, the gearbox 204 mainly includes a transmission gear 2041 and a gearbox protective cover 2042. The transmission gear 2041 is connected to an output shaft of the drive motor 203 and can be driven by the drive motor 203 to drive the front wheels 2021 or the rear wheels 2022 to rotate. That is to say, the rotation of the transmission gear 2041 is synchronized with the rotation of the traveling wheel set 202, and the wheel speed of the traveling wheel set 202 may be mapped by the rotational speed of the transmission gear 2041.

Figure 8:
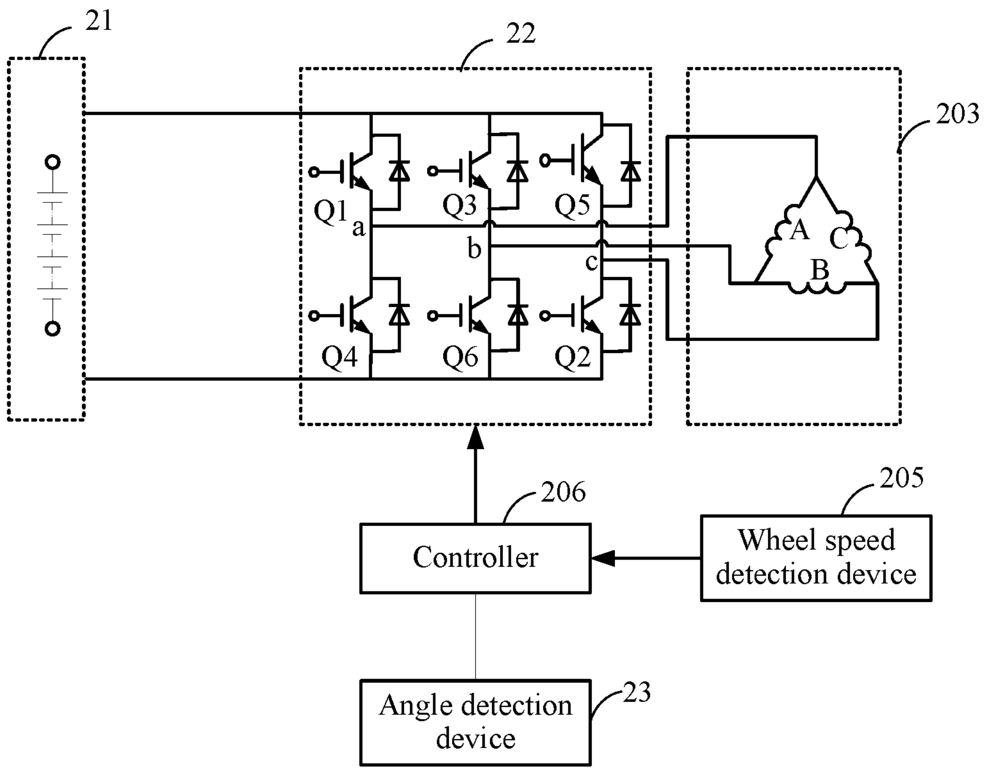
FIG. 8 is a logic control diagram of the mower in FIG. 1 or 7.

In this example, referring to FIG. 8, the control logic diagram of the mower 200 shown in FIG. 8 is basically the same as the control logic diagram of the mower 10 shown in FIG. 2, the difference is that the mower 200 includes a wheel speed detection device 205 used for detecting the wheel speed of the traveling wheel set 202, and a power supply 21, a driver circuit 22, and an angle detection device 23 in FIG. 8 that are the same as those in FIG. 2 are not repeated here. In an example, the wheel speed detection device 205 may be a Hall sensor 2051 and a magnet 2052. In other examples, the wheel speed detection device 205 may also be another detection device that can directly detect the rotational speed of the transmission gear 2041 or can directly detect the wheel speed of the traveling wheel set 202.

Figure 9A:
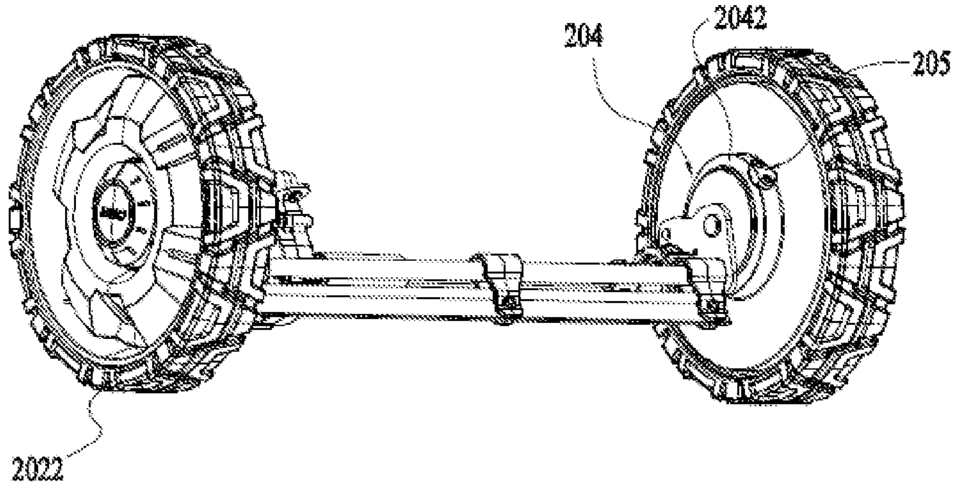
FIGS. 9A and FIG. 9B are each a structural view of a wheel speed detection device of the mower in FIG. 1 or 7 in an example.
Figure 9B:
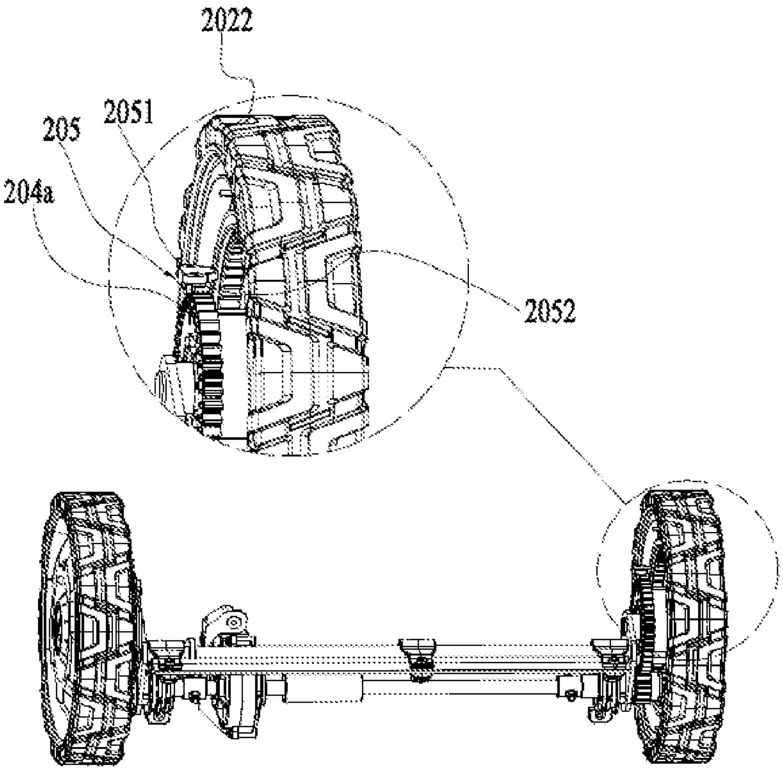

The wheel speed detection device 205 may be disposed on the gearbox 204, for example, disposed on the gearbox protective cover 2042, disposed on the front wheel 2021, disposed on the rear wheel 2022, or disposed on the transmission gear 2041. As shown in FIGS. 9A and 9B, the Hall sensor 2051 may be disposed on the outer side of the gearbox protective cover 2042, and the magnet 2052 is disposed correspondingly at the back of the Hall sensor 2051, that is to say, the magnet 2052 is disposed on the inner side of the gearbox protective cover 2042. The transmission gear 2041 may be a transmission gearset formed by a transmission bull gear **204*a* and a transmission pinion 204*b*. The Hall sensor 2051 and the magnet 2052 are disposed on the gearbox protective cover 2042 in the radial direction of the transmission bull gear 204*a*. For example, the magnet 2052 faces the top land of the transmission bull gear 204*a*. When the transmission bull gear 204*a* rotates, each rotating tooth affects the magnetic field of the magnet 2052 so that the Hall sensor 2051 may output a pulse signal according to the detected change of the magnetic field, and the controller 206 may calculate the wheel speed of the traveling wheel set 202 by identifying the pulse signal outputted by the Hall sensor 2051**.

Figure 10A:
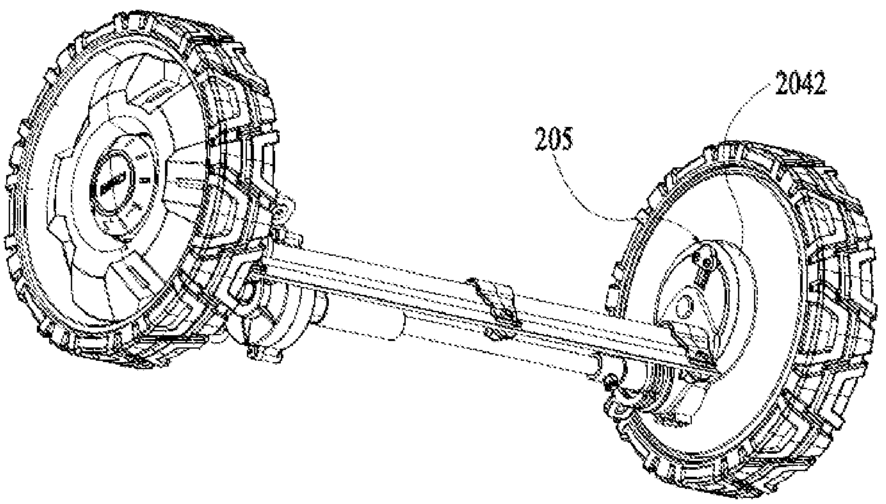
FIGS. 10A and FIG. 10B are each a structural view of a wheel speed detection device of the mower in FIG. 1 or 7 in an example.
Figure 10B:
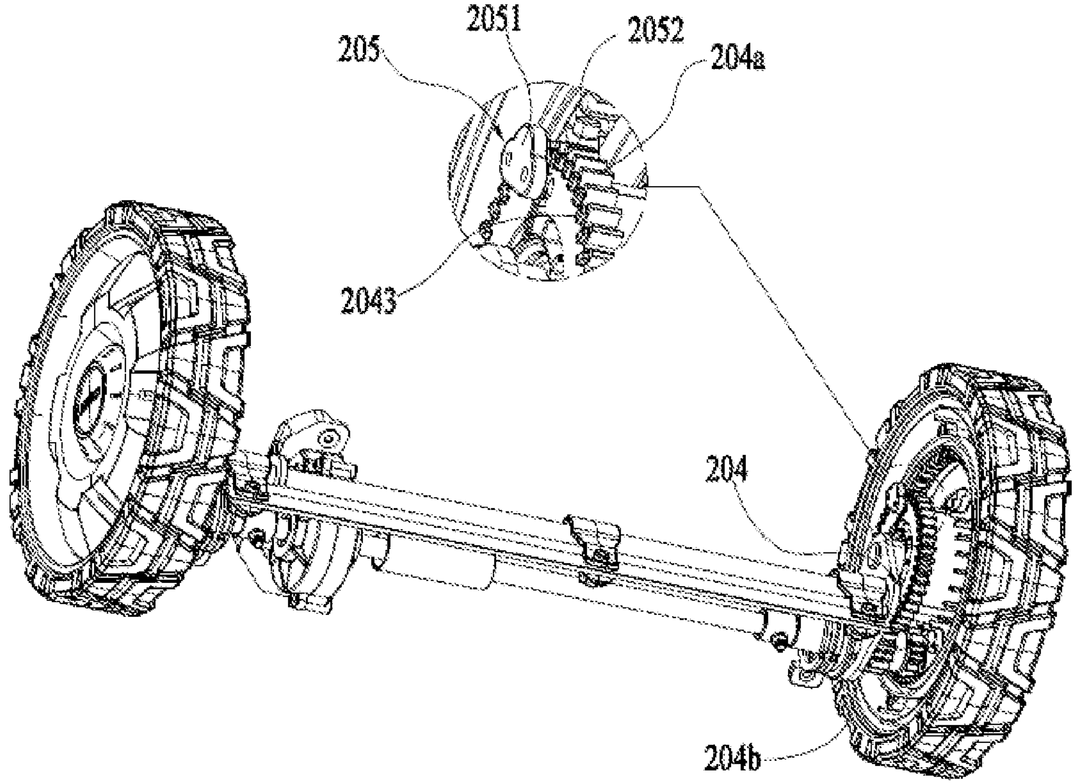

In an example, as shown in FIGS. 10A and 10B, the wheel speed detection device 205, that is, the Hall sensor 2051 and the magnet 2052, may also be disposed on the gearbox protective cover 2042 in the axial direction of the transmission bull gear **204*a*, and correspondingly, a protrusion 2043 is disposed on the side surface of each tooth of the transmission bull gear 204*a*, that is, on the tooth surface perpendicular to the axial direction of the transmission bull gear 204*a* so that during the rotation of the transmission gear 2041, the protrusion 2043 can affect the magnetic field of the magnet 2052, and the Hall sensor 2051 outputs the pulse signal. It is also to be understood that the protrusion 2043 is disposed on the end surface of the transmission bull gear 204*a* and at a position corresponding to the tooth. In this example, the number of protrusions 2043 is consistent with the number of the teeth of the transmission bull gear 204*a*, and the shape of the protrusion 2043 may be basically consistent with the shape of the tooth of the transmission bull gear 204*a***.

Figure 11A:
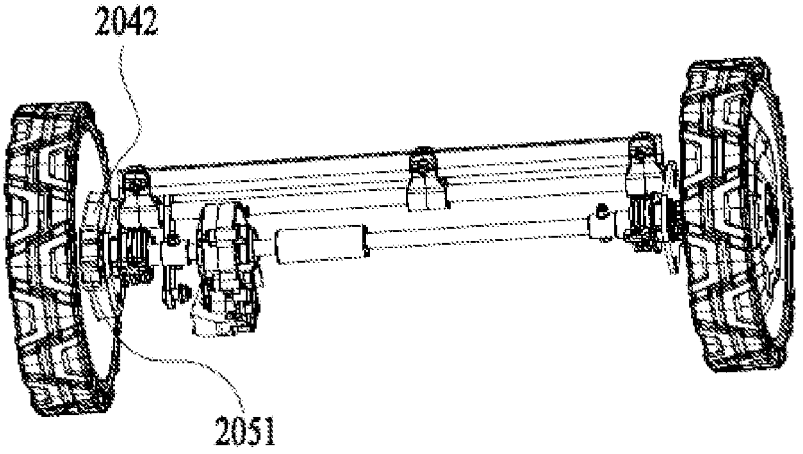
FIGS. 11A and FIG. 11B are each a structural view of a wheel speed detection device of the mower in FIG. 1 or 7 in an example.
Figure 11B:
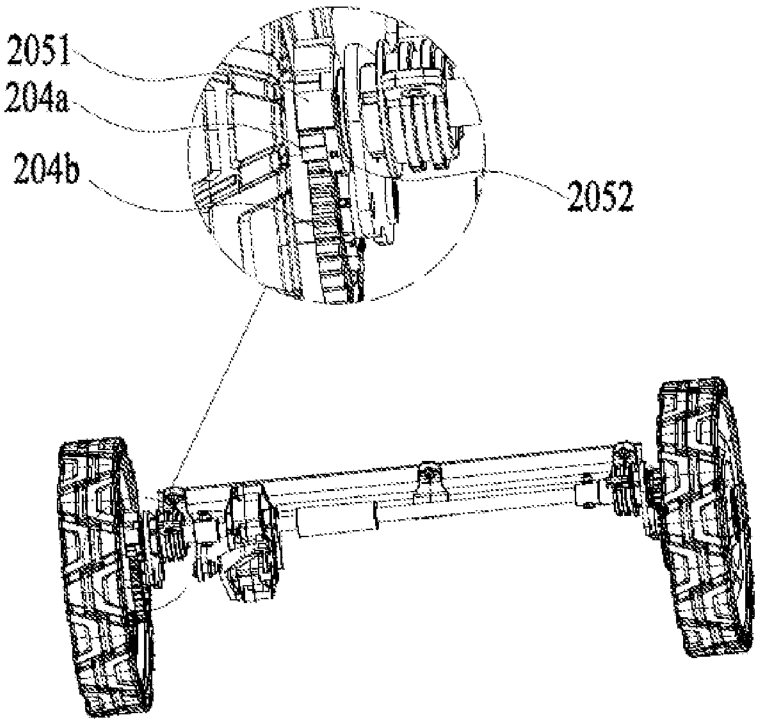

The wheel speed detection device 205 shown in FIGS. 8 and 9 detects the rotational speed of the transmission bull gear **204*a* to determine the wheel speed. In an example, the wheel speed detection device 205 may also detect the rotational state of the transmission pinion 204*b* to determine the wheel speed. As shown in FIGS. 11A and 11B, a ring of magnets 2052 may be mounted at the end of the transmission pinion 204*b*, and at least two Hall sensors 2051 may be mounted on the gearbox protective cover 2042 in the radial direction of the transmission pinion 204*b*. During the rotation of the transmission pinion 204*b*, the magnets 2052 are driven to rotate so that the Hall sensor 2051 can detect the direction of rotation and the rotational speed of the transmission pinion 204*b***.

In this example, multiple wheel speed detection devices 205 may be provided to separately detect the wheel speed of the front wheels 2021 and the wheel speed of the rear wheels 2022, separately detect the wheel speed of the left front wheel and the right front wheel, or separately detect the wheel speed of the left rear wheel and the right rear wheel. The controller 206 may identify the wheel speed of the left and right rear wheels 2022 according to the wheel speed detected by different wheel speed detection devices and identify the turning condition according to the speed difference between the two rear wheels. If drive motors 203 are provided for the two rear wheels 2022 of the mower 200, after identifying the turning condition, the controller 206 may control the two drive motors 203 to differentially provide power assistance to make the mower 200 turn. If the mower 200 is provided with one drive motor 203 to drive the two rear wheels 2022, after identifying the turning condition, the controller 206 may control the drive motor 203 to not provide power assistance, and the mower 200 turns through the thrust of a person. Alternatively, the controller 206 may identify the wheel speed of the left and right front wheels 2021 according to the wheel speed detected by different wheel speed detection devices, then identify whether the mower 200 is in the turning condition or in a working condition where the front wheels 2021 are lifted, and control the drive motor 203 to stop providing power assistance when the identification result is yes.

Figure 12:
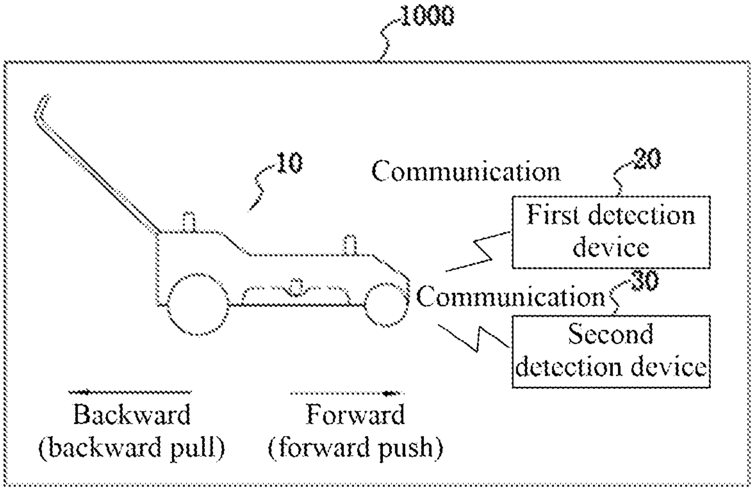
FIG. 12 is a schematic diagram of a garden tool system in an example of the present application.

The forward, backward, forward push, backward pull, and the like mentioned below are all defined from the perspective of the user when an outdoor traveling device is working. As shown in FIG. 12, the case where the user holds the handle and pushes the device in the direction of the forward arrow in the figure is the forward push, and the case where the user holds the handle and pulls the device in the direction of the backward arrow in the figure is the backward pull.

A garden tool system 1000 shown in FIG. 12 may include a garden tool 10 or an outdoor traveling device 10, a first detection device 20, and a second detection device 30. The garden tool 10 may be the mower 10 shown in FIG. 1 or the mower 200 shown in FIG. 7. The mower 10 shown in FIG. 1 is used as an example for the description below.

Figure 13:
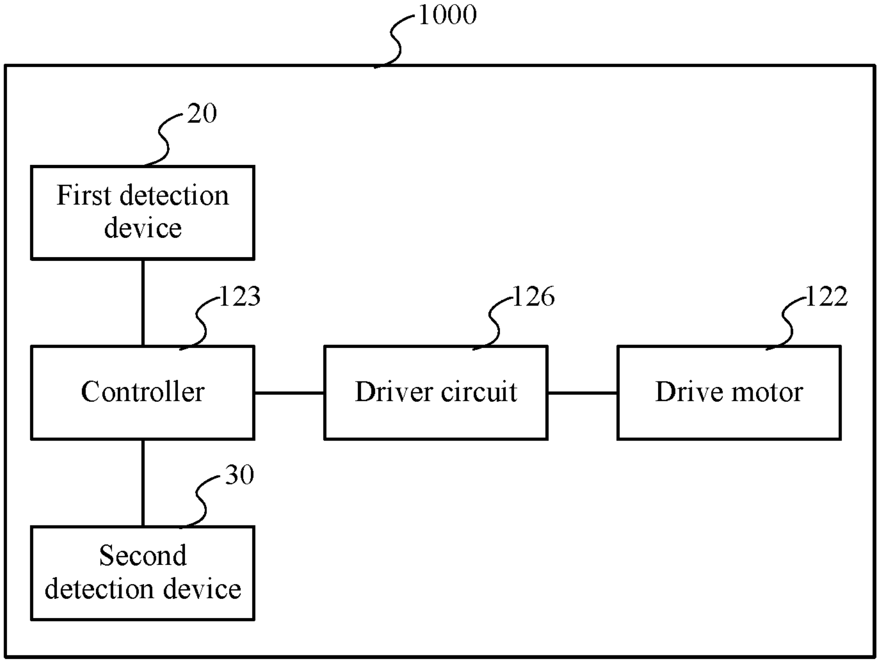
FIG. 13 is a schematic diagram of a control system of a mower.

In this example, the first detection device 20 is used for detecting the relative state between the mower 10 and an operator, where the relative state between the mower 10 and the operator may include a relative state at any moment or the change of the relative state at any period. The second detection device 30 is used for detecting the traveling state of the mower 10. In an example, the relative state between the mower 10 and the operator may include the relative distance, the change of the relative distance, the relative speed, the change of the relative speed, the relative acceleration, or the change of the relative acceleration. The traveling state of the mower 10 may include a stationary state, a forward state, and a backward state. In the mowing system shown in FIG. 13, the controller 123 can control the condition of the drive motor 122 providing power assistance according to the preceding traveling state and the relative state, for example, control the drive motor 122 to provide power assistance, not provide power assistance, provide forward power assistance, or provide backward power assistance. Further, the power-assisting state may include gradually increasing power assistance in the forward direction, gradually decreasing power assistance in the forward direction, gradually increasing power assistance in the backward direction, or gradually decreasing power assistance in the backward direction. It is to be noted that in the mowing system shown in FIG. 13, the controller 123, the driver circuit 126, and the drive motor 122 all belong to the mower 10, and a power supply module, a control switch, and the like that may be disposed in a control system of the mower 10 are not shown. Further, the first detection device 20 and the second detection device 30 may or may not belong to the mower 10, which is not limited here.

In this example, the drive motor 122 provides power assistance or does not provide power assistance to make the traveling assembly 121 travel forward or backward or stand still. The forward traveling may include forward accelerated traveling, forward decelerated traveling, or forward constant-speed traveling, and the backward traveling may include backward accelerated traveling, backward decelerated traveling, or backward constant-speed traveling.

In an example, when the mower 10 is in different traveling states, according to the relationship between the relative state between the mower 10 and the operator and the preset threshold, the controller 123 may set a control strategy to control the drive motor 122 to work. The control strategy set by the controller 123 corresponds to enabling the drive motor 122 to provide power assistance, not provide power assistance, provide forward power assistance, provide backward power assistance, or the like.

The relationship between the power assist strategy, the traveling state of the mower, and the relative state between the mower and the operator is shown in the table described below.

TABLE 1

| Traveling state of the mower | Relative state between the mower and the operator | Power assistance strategy |
|---|---|---|
| Stationary | Less than or equal to a threshold | Provide forward power assistance |
| | Greater than the threshold | Provide backward power assistance |
| Forward | Less than or equal to the threshold | Provide forward power assistance |
| | Greater than the threshold | Not provide power assistance |
| Backward | Less than or equal to the threshold | Not provide power assistance |
| | Greater than the threshold | Provide backward power assistance |

Figure 14:
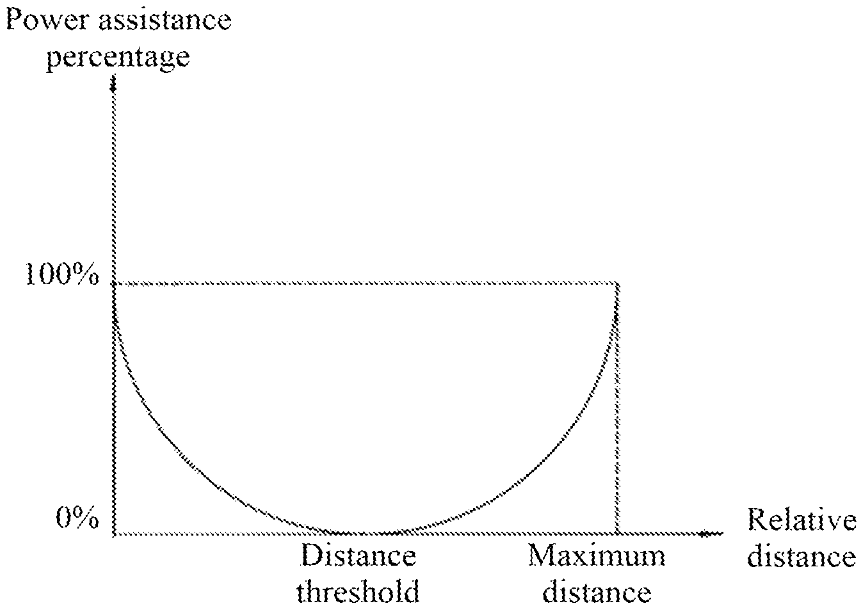
FIG. 14 is a schematic diagram illustrating the relationship between the relative distance and a power-assisting state of a mower in a traveling state.

In an example, when the traveling state of the mower 10 is the stationary state and the relative distance between the mower 10 and the operator is less than or equal to the set distance threshold, it may be considered that the operator wants to push the mower 10 forward to start. After recognizing this intention, the controller 123 may control the drive motor 122 to provide forward power assistance so that the operator can control the mower 10 to start to travel forward without the relatively large thrust, and the user feels more comfortable when starting the mower 10. When the traveling state of the mower 10 is the stationary state and the relative distance between the mower 10 and the operator is greater than the set distance threshold, it may be considered that the operator wants to pull the mower 10 backward to start. After recognizing this intention, the controller 123 may control the drive motor 122 to provide backward power assistance so that the operator can control the mower 10 to start to travel backward without the relatively large pull force. As shown in FIG. 14, when the mower 10 is in the stationary state, the set distance threshold is the cut-off point of the process of the controller 123 changing the power-assisting state of the drive motor 122 according to the distance between the operator and the mower 10, where the process includes the process of gradually decreasing the power assistance percentage and the process of gradually increasing the power assistance percentage. In this example, the set distance threshold is related to the weight of the mower 10 or the resistance in the environment (for example, the grassland frictional resistance), which is not specifically limited here.

Figure 15:
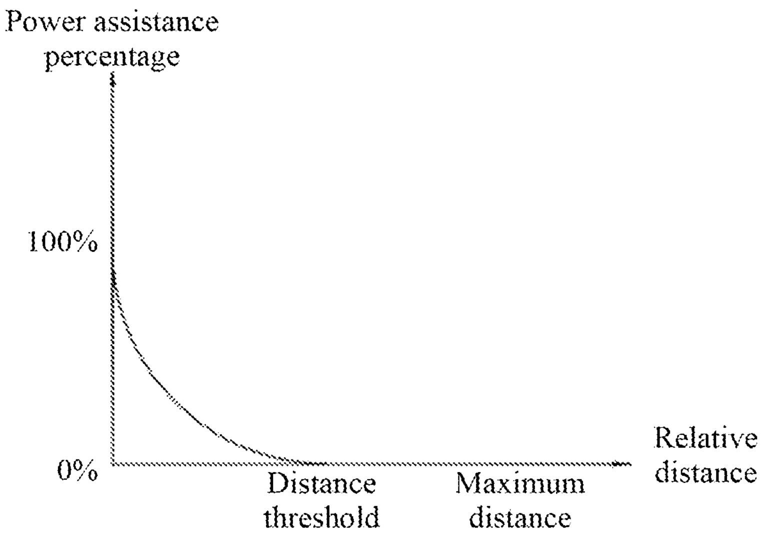
FIG. 15 is a schematic diagram illustrating the relationship between the relative distance and a power-assisting state of a mower in a traveling state.

In an example, when the traveling state of the mower 10 is the forward state and the relative distance between the mower 10 and the operator is less than or equal to the set distance threshold, it may be considered that the operator wants to push the mower 10 forward to accelerate and travel. After recognizing this intention, the controller 123 may control the drive motor 122 to provide forward power assistance so that the operator can control the mower 10 to accelerate and travel forward without the relatively large thrust. When the traveling state of the mower 10 is the forward state and the relative distance between the mower 10 and the operator is greater than the set distance threshold, it may be considered that the operator wants to reduce the forward traveling speed or wants the mower 10 to gradually stop. After recognizing such an intention, the controller 123 may control the drive motor 122 to not provide power assistance. Therefore, the mower 10 without power assistance slowly decelerates until the mower 10 stops traveling. As shown in FIG. 15, when the mower 10 is in the forward state, the process of the controller 123 changing the power-assisting state of the drive motor 122 according to the distance between the operator and the mower 10 includes the process of gradually decreasing the power assistance percentage and the process of not providing power assistance. In this example, the set distance threshold is related to the weight of the mower 10 or the resistance in the environment (for example, the grassland frictional resistance), which is not specifically limited here.

Figure 16:
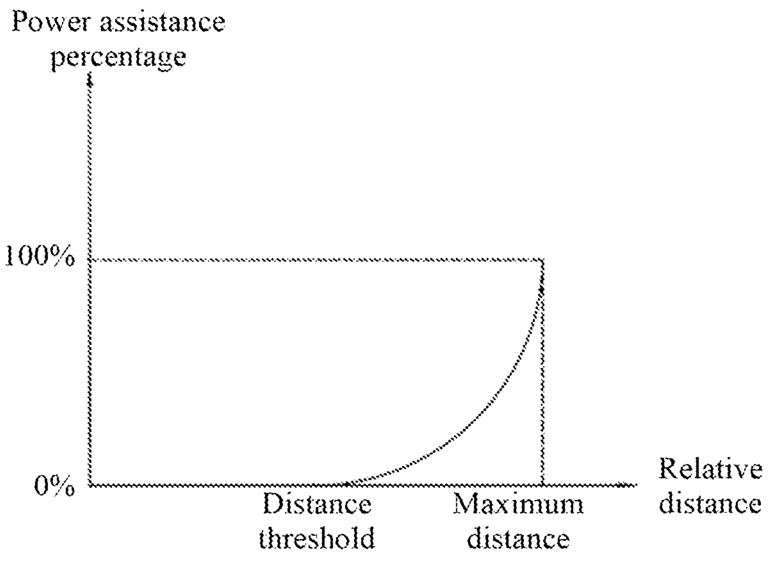
FIG. 16 is a schematic diagram illustrating the relationship between the relative distance and a power-assisting state of a mower in a traveling state.

In an example, when the traveling state of the mower 10 is the backward state and the relative distance between the mower 10 and the operator is less than or equal to the set distance threshold, it may be considered that the operator wants to reduce the backward traveling speed or wants the mower 10 to gradually stop. After recognizing such an intention, the controller 123 may control the drive motor 122 to not provide power assistance. Therefore, the mower 10 without power assistance slowly decelerates until the mower 10 stops traveling. When the traveling state of the mower 10 is the backward state and the relative distance between the mower 10 and the operator is greater than the set distance threshold, it may be considered that the operator wants to pull the mower 10 backward to accelerate and travel. After recognizing this intention, the controller 123 may control the drive motor 122 to provide backward power assistance so that the operator can control the mower 10 to accelerate and travel backward without the relatively large pull force. As shown in FIG. 16, when the mower 10 is in the backward state, the process of the controller 123 changing the power-assisting state of the drive motor 122 according to the distance between the operator and the mower 10 includes the process of not providing power assistance and the process of gradually increasing the power assistance percentage. In this example, the set distance threshold is related to the weight of the mower 10 or the resistance in the environment (for example, the grassland frictional resistance), which is not specifically limited here.

In the schematic diagrams of the power assistance strategies shown in FIGS. 14 to 16, the maximum distance between the mower 10 and the operator may be the average length of a human arm obtained through multiple sampling. In different traveling states of the mower 10, set distance thresholds may be the same or different. For example, in different traveling states, the set distance threshold may be half of the maximum distance. The preceding relative state mainly refers to the relative distance. In other examples, the relative state may also be the relative speed or the relative acceleration, which is not limited here.

In the preceding example, it is to be understood that the controller 123 can recognize the operating intention of the user according to the relative state between the mower 10 in different traveling states and the operator and then set the control strategy.

In this example, the first detection device 20 in the tool system 1000 may be one or more types of sensors in the mower 10 or on the mower 10 and may be, for example, disposed in the handle device 11 or in the body 12. The second detection device 30 may be one or more types of sensors in the mower 10 or on the mower 10 and may be, for example, disposed in the handle device 11 or in the body 12. In this example, the first detection device 20 may be connected to the controller 123 to output detection information to the controller 123 so that the controller 123 may analyze the relative state between the operator and the mower 10 according to the obtained information. In an example, the first detection device 20 may be a distance sensor, such as an ultrasonic distance sensor, a laser distance sensor, a magnetostrictive distance sensor, and the like. In this example, the first detection device 20 and the second detection device 30 may be the same device and are collectively referred to as detection devices. That is to say, the controller 123 may obtain the traveling state of the mower 10 according to the parameter detected by one detection device and analyze the relative state between the operator and the mower 10.

Figure 17:
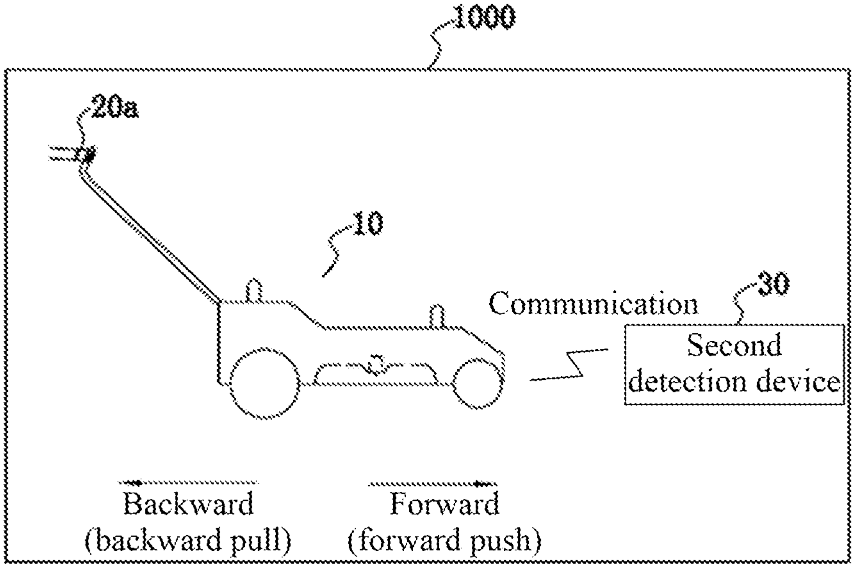
FIG. 17 is a schematic diagram of an outdoor traveling device system in an example of the present application.

Referring to an outdoor traveling device system 1000 shown in FIG. 17, the first detection device 20 includes a wearable smart terminal device 20*a*, such as a smartwatch, a sports bracelet, or a smartphone. A receiving end (not shown) capable of communicating with the wearable smart terminal device 20*a* is disposed in the outdoor traveling device 10, and the wearable smart terminal device 20*a* and the receiving end can perform short-distance wireless communication, such as Bluetooth communication. In this example, the receiving end in the outdoor traveling device 10 may send the wearable smart terminal device 20*a* to the controller 123 so that the controller 123 can analyze the relative state between the operator and the outdoor traveling device 10, for example, the relative distance. In an example, the receiving end may also be integrated into the controller 123.

Figure 18:
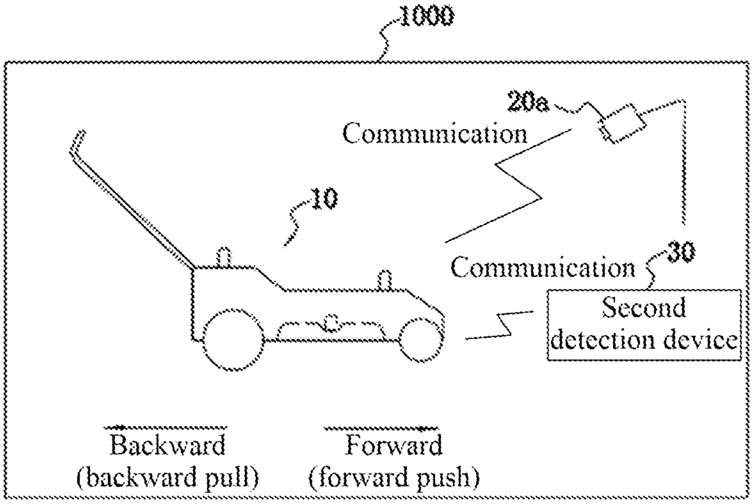
FIG. 18 is a schematic diagram of an outdoor traveling device system in an example of the present application.

Referring to the outdoor traveling device system 1000 shown in FIG. 18, the first detection device 20 includes a third-party device 20*b* that is fixedly disposed in some places independently of the outdoor traveling device 10, for example, an image collection device disposed on the work site of the outdoor traveling device 10, such as a camera, or a distance collection device, such as a laser rangefinder. For example, distance measuring cameras may be disposed in different directions on the work site of the mower and can collect the distance between the operator and the mower at different angles so that the controller can analyze the actual relative distance between the mower and the operator.

Figure 19:
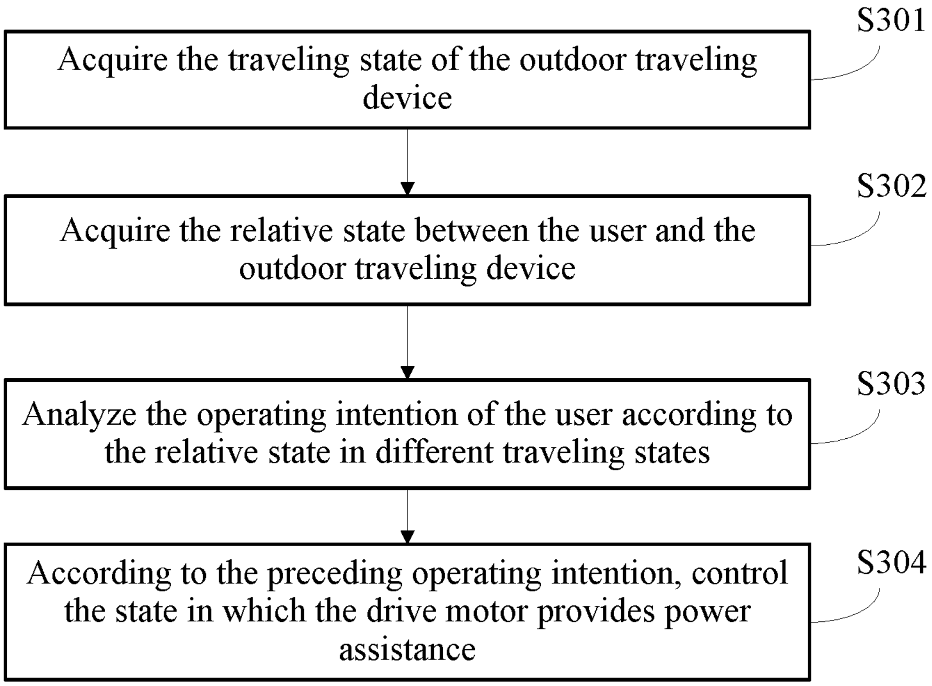
FIG. 19 is a flowchart of a method for controlling a power-assisting state of an outdoor traveling device in an example of the present application.

In an example, as shown in FIG. 19, the process of the controller controlling the state in which the drive motor provides power assistance is described below.

In S301, the traveling state of the outdoor traveling device is acquired.

In S302, the relative state between the user and the outdoor traveling device is acquired.

In S303, the operating intention of the user is analyzed according to the relative state in different traveling states.

In S304, the state in which the drive motor provides power assistance is controlled according to the preceding operating intention.

An example in which the controller 123 in the mower 10 controls the drive motor 122 to provide power assistance according to the recognized operating intention of the user and the current motion state of the mower 10 is described below. For example, the controller 123 can determine and control the power assistance direction, the output power, or the output torque of the drive motor 122 according to the motion information of the drive wheel and the operating intention of the user.

In this example, the motion information of the drive wheel can reflect the movement tendency of the drive wheel, and the movement tendency of the drive wheel corresponds to the operating intention of the user. The operating intention of the user may include the magnitude, direction, or acceleration of the force applied to the handle device 11 when the user wants the mower 10 to have a movement tendency. In this example, the controller 123 may analyze the movement tendency of the drive wheel according to the motion information of the drive wheel to determine the operating intention of the user. For example, when the drive wheel has the forward acceleration, the mower 10 has the movement tendency of moving forward, and the corresponding operating intention of the user is the forward push. In this example, the motion information of the drive wheel may be detected by a motion sensor (not shown). The motion sensor may be a photoelectric sensor, an ultrasonic sensor, a microwave sensor, or the like. Different types of motion sensors may have different installation positions or mounting manners on the mower or the drive wheel, which is not described in detail here. In this example, the motion sensor can directly detect the direction of rotation, the speed, or the acceleration of the drive wheel.

When the user holds the handle and pushes the mower forward, the drive wheels can roll forward with the operation of the user, reflecting the operating intention of the user in time. Therefore, according to the motion information of the mower 10 and the operating intention of the user, the controller 123 controls the drive motor 122 to work to drive the drive wheels to roll forward. The mower 10 travels forward under the action of the forward rolling drive wheels, and the user holding the handle device 11 just needs to apply the small forward thrust to achieve the effect that the mower follows the user to travel forward so that the user feels more comfortable.

In an example, if the user feels that the mower 10 travels forward at an appropriate speed with the assistance of the forward thrust when the user holds the handle device 11 to push the mower 10 forward, the drive motor 122 may maintain the current working state to drive the drive wheels to rotate forward, and the user holding the handle device 11 just needs to apply the small forward thrust to make the mower 10 follow the user to travel forward. If the user feels that the forward speed of the mower 10 is too slow with the assistance of the forward force and wants to increase the speed, the user just needs to increase the applied forward thrust to change the operating intention so that the drive motor can adjust the current state to drive the rear wheels to accelerate and rotate forward. For example, the drive motor 122 may increase the forward output power, the output rotational speed, the output torque, or the like. If the speed of the mower is appropriate after the speed is increased, the user may continue holding the handle device 11 and apply the small forward thrust to make the mower follow the user to travel forward. If the user feels that the forward speed of the mower is too fast with the assistance of the forward force and wants to decrease the speed, due to the friction of the ground, the user just needs to reduce the applied forward thrust so that the drive motor may adjust the current state to drive the rear wheels to decelerate and rotate forward. If the speed of the mower is appropriate after the speed is decreased, the user may continue holding the handle device 11 and apply the small forward thrust to make the mower follow the user to travel forward. It is to be noted that, in conjunction with the current motion information of the drive motor 122, the controller 123 changes the working state of the drive motor 122 according to the operating intention of the user, that is, the controller 123 controls the drive motor 122 to change power assistance according to the operating intention of the user in the current motion state reflected by the current motion information. The preceding process illustrates the process in which the controller 123 provides power assistance according to the operating intention of the user and the current motion information when the user holding the handle of the mower travels forward.

Similarly, if the user wants to pull the mower backward to make the mower stop forward or travel backward, the user holding the handle device 11 applies a backward pull force, causing the drive wheels to have a tendency of slowing down rapidly. In practical applications, based on the speed of the drive wheels and the push-pull force of the human hand, whether the mower has a tendency of stopping forward or traveling backward is analyzed. For example, when the mower 10 travels forward, the rear wheels rotate forward, and the user holding the handle device 11 continuously applies a backward pull force to determine whether the mower 10 has a tendency of stopping forward or traveling backward. When the mower 10 has a tendency of stopping forward, it is recognized that the operating intention of the user is to park forward or pull backward. For example, when the user holds the handle device 11 to make the mower 10 travel forward to mow the lawn, the mower encounters an obstacle, and the user wants to stop the mower, or when the user finds a place where the grass grows vigorously, wants to stop, and lets the mower 10 mow the lawn in the place, the user has an operating intention of parking forward. For example, in the case where the user holds the handle device 11 to make the mower 10 reach the boundary of the lawn and the machine needs to be pulled out after mowing or in the case where the user mows in one place by pushing forward and pulling backward, the user has an operating intention of pulling backward. In fact, no matter whether the operating intention of the user is to park forward or pull backward, the case where the forward speed of the mower 10 decreases to zero exists. The controller 123 acquires the motion information of the mower and controls the drive motor 122 to provide backward power assistance to accelerate the decrease of the forward speed of the mower 10 so that the mower 10 stops quickly and stays in place or the forward speed of the mower quickly decreases to zero and then the mower travels backward. When the mower 10 has a tendency of stopping forward, no power assistance may be provided. The friction of the ground may be used as backward power assistance.

In an example, when the mower 10 travels backward, if the user wants to push the mower 10 forward to make the mower 10 stop backward or travel forward, the user holding the handle device 11 applies the forward thrust, causing the rear wheels to have a tendency of slowing down rapidly. In practical applications, based on the speed of the rear wheels and the push-pull force of the human hand, whether the mower 10 has a tendency of stopping backward or traveling forward is analyzed. For example, when the mower 10 travels backward, the rear wheels rotate backward, and the user holding the handle device 11 continuously applies the forward thrust to determine whether the mower 10 has a tendency of stopping backward or traveling forward. When the mower 10 has a tendency of stopping backward, it is recognized that the operating intention of the user is to park backward or push forward. In the case of parking backward, for example, the user holds the handle device 11 to make the mower travel backward and wants to stop the mower after pulling the mower out from the boundary of the lawn. In the case of pushing forward, for example, the user mows in one place by pushing forward and pulling backward. No matter whether the operating intention of the user is to park backward or push forward, the case where the backward speed of the mower 10 decreases to zero exists. The controller 123 acquires the device parameters of the mower and controls the drive motor 122 to provide forward power assistance to accelerate the decrease of the backward speed of the mower 10 so that the mower 10 stops quickly and stays in place or the backward speed of the mower 10 quickly decreases to zero and then the mower 10 travels forward. When the mower 10 has a tendency of stopping backward, no power assistance may be provided. The friction of the ground may be used as forward power assistance.

Figure 20:
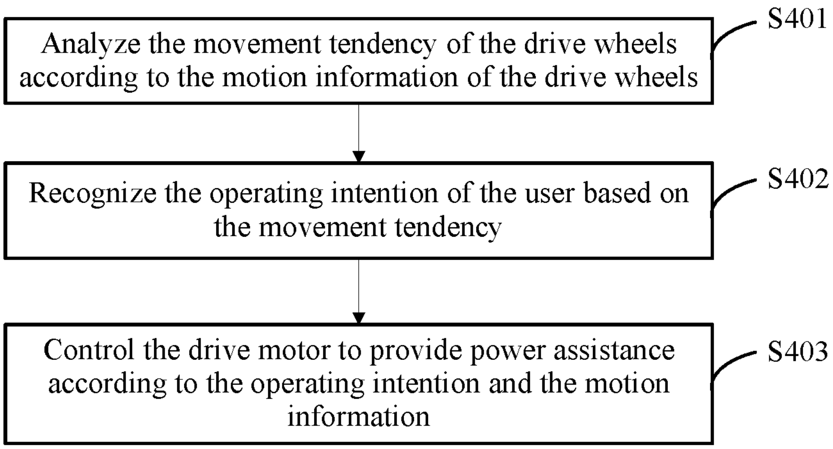
FIG. 20 is a flowchart illustrating the power-assisting control of a mower in an example of the present application.

In an example, as shown in FIG. 20, the step in which, based on the motion information of the drive wheels, the controller recognizes the operating intention of the user operating the mower may include the steps described below.

In S401, the movement tendency of the drive wheels is analyzed according to the motion information of the drive wheels.

In S402, the operating intention of the user is recognized based on the movement tendency.

In S403, the drive motor is controlled to provide power assistance according to the operating intention and the motion information.

In a specific example, the pressure sensor on the handle device 11 can sense the thrust or pull force of the user to recognize the operating intention of the user. Further, the controller 123 may control the drive motor 122 to work based on the current motion state of the mower 10 operated by the user, so as to output adaptive power assistance. For example, if the mower 10 is currently in a forward traveling state and the pressure sensor detects that the thrust applied by the user to the handle device 11 increases, the controller 123 controls the drive motor 122 to output forward power assistance to increase the forward speed of the mower. If the pressure sensor detects that the thrust increases again, the drive motor 122 may be controlled to increase the forward speed again, for example, the drive motor 122 may be controlled to increase the output power of forward power assistance. If the mower 10 is currently in the forward traveling state, the user pulls the handle device 11 backward, and the pressure sensor detects the backward pull force, then the controller 123 may control the drive motor 122 to output backward power assistance to accelerate the decrease of the forward speed. If the speed of the mower 10 decreases to zero through the backward pull force and the pressure sensor no longer detects the push-pull force, the mower 10 may be parked in site. If the user pulls the handle device 11 backward after the mower 10 is parked and the pressure sensor detects the pull force, the controller 123 may control the drive motor 122 to increase the output power of backward power assistance to assist the mower 10 in moving backward.

Figure 21:
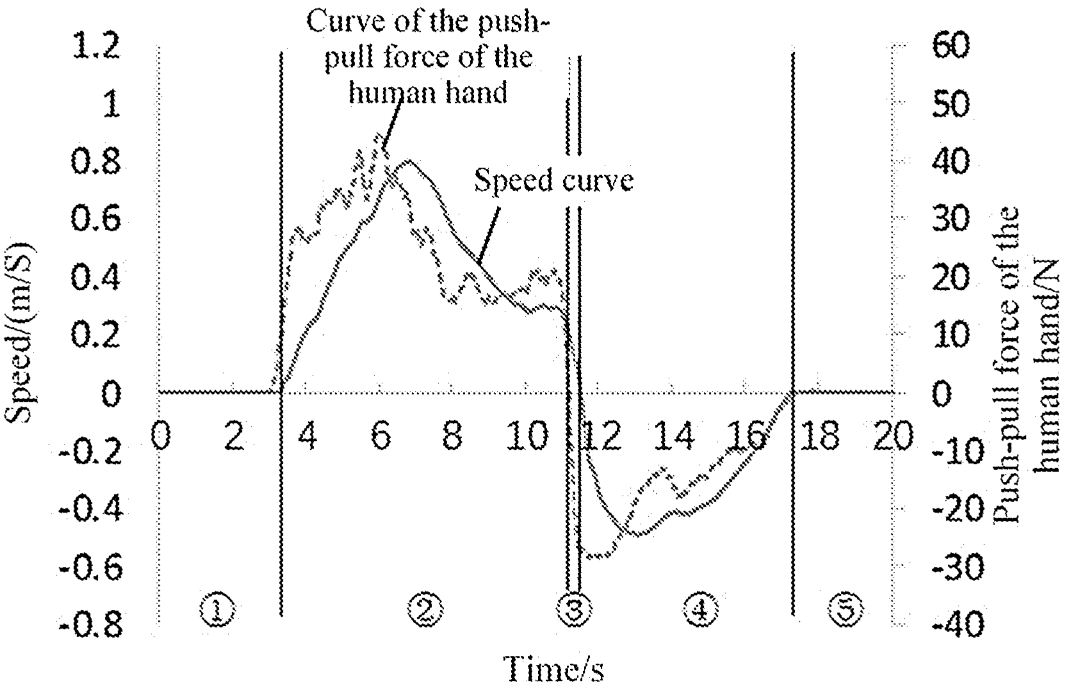
FIG. 21 is a schematic diagram illustrating the relationship between the speed and the force in the power-assisting control of a mower in an example of the present application.

When the preceding method is performed in detail, the description is made in conjunction with the curves of the speed and force shown in FIG. 21 for easy understanding. FIG. 21 shows the curves of the speed and the push-pull force of the human hand in an operation process of pushing forward and pulling backward the mower 10. In FIG. 21, the speed with a positive value is the forward traveling speed of the mower 10, and the speed with a negative value is the backward traveling speed of the mower 10. In the figure, the push-pull force of the human hand with a positive value is the thrust of the human hand, and the push-pull force of the human hand with a negative value is the pull force of the human hand.

In the first stage, the speed of the mower 10 and the push-pull force of the human hand are both zero, the mower 10 is in the stationary state, and the operating intention of the user is to park forward.

In the second stage, the speed of the mower 10 and the push-pull force of the human hand are both positive values, and the mower 10 is in the forward state. According to the speed curve and the curve of the push-pull force of the human hand, it can be analyzed that the relatively large thrust of the human hand is first applied to accelerate the mower 10 forward, then the applied thrust of the human hand is reduced to decelerate the forward speed of the mower 10, and the operating intention of the user is to accelerate and push forward the mower 10 and then decelerate and push forward the mower 10.

In the third stage, the speed of the mower 10 is a positive value, the push-pull force of the human hand is a negative value, the mower 10 is in a state of stopping forward, and the operating intention of the user is to park forward or pull backward.

In the fourth stage, the speed of the mower 10 and the push-pull force of the human hand are both negative values, and the mower 10 is in the backward state. According to the speed curve and the curve of the push-pull force of the human hand, it can be analyzed that the relatively large pull force of the human hand is first applied to accelerate the mower 10 backward, then the applied pull force of the human hand is reduced to decelerate the backward speed of the mower 10, and the operating intention of the user is to accelerate and pull backward the mower 10 and then decelerate and pull backward the mower 10.

In the fifth stage, the backward speed of the mower 10 decreases to zero, and the push and pull force of the human hand is zero, showing that the movement tendency of the mower 10 is a parking stage after the backward stop.

In this example, the case of the controller 123 recognizing the operating intention of the user according to the movement tendency of the mower 10 may include at least one of the cases described below.

When the movement tendency is the forward traveling tendency, the operating intention is to push forward; when the movement tendency is the forward stopping tendency, the operating intention is to park forward or pull backward; when the movement tendency is the backward traveling tendency, the operating intention is to pull backward; when the movement tendency is the backward stopping tendency, the operating intention is to park backward or push forward; and when the movement tendency is stationary, the operating intention is to stop.

In an example, the forward stopping tendency may be understood as a movement tendency in which the forward speed is lower than a first threshold and is reduced continuously, and the backward stopping tendency may be understood as a movement tendency in which the backward speed is lower than a second threshold and is reduced continuously. The first threshold may be the same as or different from the second threshold. The values of the two thresholds may be determined by various monitoring methods or algorithms, which are not specifically limited in this example.

In an example, the user has various operating intentions, and at least part of the operating intentions are set to require power assistance. Therefore, after the operating intention of the user is recognized, the controller determines whether the recognized operating intention is one of the at least part of the operating intentions set to require power assistance among the various operating intentions, and if so, determines the power assistance parameter according to the operating intention and the motion information. The table below is used as an example.

TABLE 2

| Movement tendency | Operating intention | Power assistance solution |
|---|---|---|
| Stationary | Stop | Not provide power assistance |
| Forward | Accelerate and push forward | Forward power assistance |
| | Decelerate and push forward | Forward power assistance |
| Stop forward | Stop forward/pull backward | Not provide power assistance/backward power assistance |
| Backward | Accelerate and pull backward | Backward power assistance |
| | Decelerate and pull backward | Backward power assistance |
| Stop backward | Stop backward/push forward | Not provide power assistance/forward power assistance |

Figure 22:
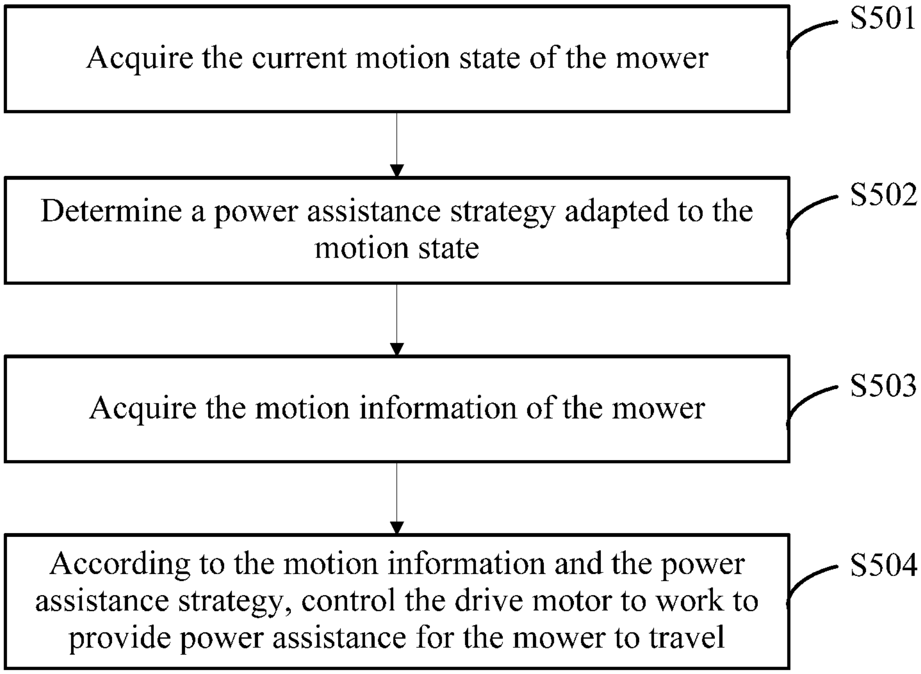
FIG. 22 is a flowchart illustrating the power-assisting control of a mower in an example of the present application.

In an example, FIG. 22 shows a flowchart of a power assisting method of a mower. The method specifically includes the steps described below.

In S501, the current motion state of the mower is acquired.

In an example, the motion sensor may detect the motion information of the drive wheels to determine the motion state of the mower. For example, when according to the detected motion signal, it is determined that the drive wheels travel forward, the mower is currently in a forward pushing and traveling state; when according to the detected motion signal, it is determined that the drive wheels travel backward, the mower is currently in a backward pulling and traveling state; and when according to the detected motion signal, it is determined that the drive wheels are stationary, the mower is currently in a parking state.

In S502, a power assistance strategy adapted to the motion state is determined.

In S503, the motion information of the mower is acquired.

According to the motion signal detected by the sensor, the controller may determine the motion information of the mower, such as the motion direction and speed of the drive wheels. Optionally, the controller may also calculate the acceleration of the drive wheels or can directly detect the acceleration.

In S504, according to the motion information and the power assistance strategy, the drive motor is controlled to work to provide power assistance for the mower to travel.

When the user operation is recognized as the forward stopping tendency according to the motion information, the drive motor may be controlled to output adaptive backward power assistance based on the motion information to accelerate the decrease of the forward speed of the mower. On the contrary, if the user operation is not the forward stopping tendency, based on the motion information, the drive motor may be controlled to output adaptive forward power assistance or stop working.

In examples of the present application, many types of walk-behind power assisted electric devices exist, such as a walk-behind, hand-pushing lawn mower, a snow thrower, a wheeled tool box, a wheeled cart or forklift, a wheeled power supply device, a wheeled blower or fan, and a bracket of a tool device, which are not listed here. In some examples, the walk-behind electric device may be a walk-behind power assisted electric device. In this example, the walk-behind power assisted electric device may be understood as a device in which a user can manually push/pull a position such as a device body or a handle so that a power assisted apparatus in the device generates the assistance. The so-called assistance may be understood as the following: a device provides a force with a certain magnitude and direction to help the device to move; at the same time, the power assisted apparatus of the device may also adjust a magnitude and a direction of the assistance outputted by the power assisted apparatus according to the force applied by the user so that the comfort of the user is ensured. That is to say, the assistance provided by the power assisted apparatus in the device can change with the force applied by the user.

Figure 23:
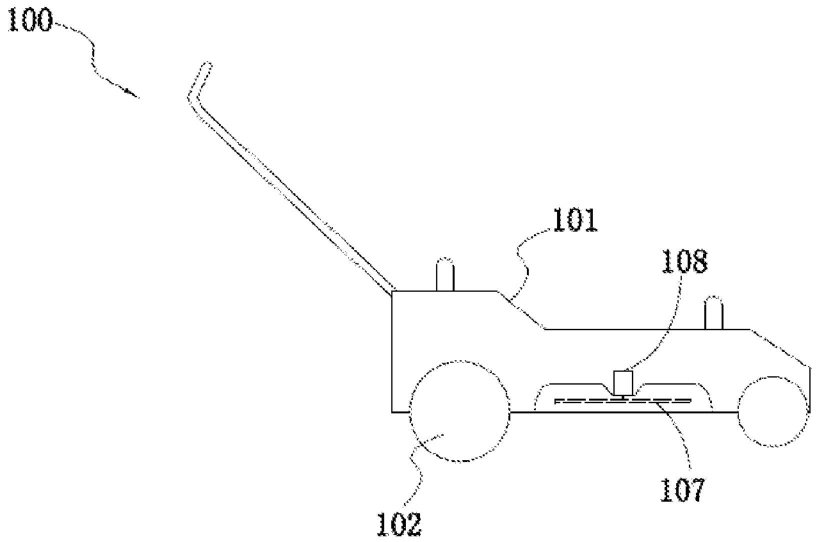
FIG. 23 is a structural view of a walk-behind electric device.
Figure 24:
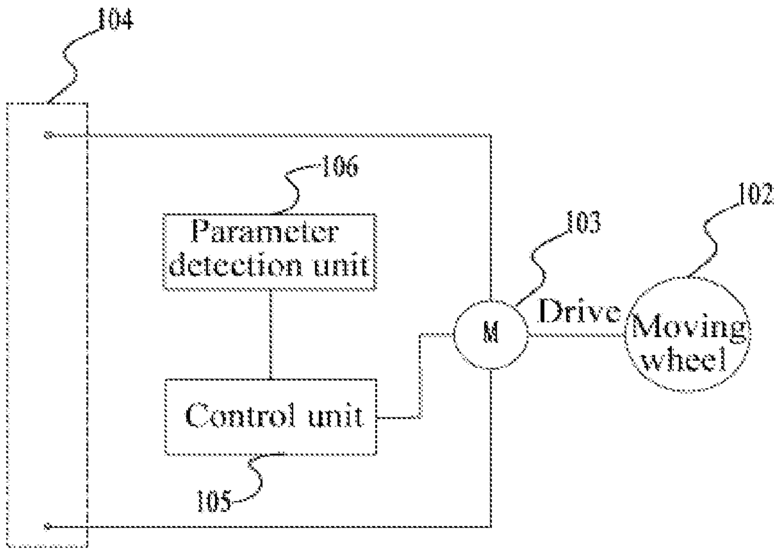
FIG. 24 is a diagram of a control circuit of a walk-behind electric device.

As shown in FIGS. 23 and 24, a walk-behind electric device 100 may be a hand-guided working machine. The walk-behind electric device 100 may include at least a device body 101, a moving wheel 102 connected to the device body 101, a moving motor 103 that drives the moving wheel 102, a power interface 104, and a control unit 105. The power interface 104 can be connected to a power supply so as to supply power to at least the moving motor 103. The control unit 105 can identify, according to device parameters of the walk-behind electric device 100, an auxiliary operation that the user wants to perform on the walk-behind electric device 100 and then output control information to control a rotational state of the moving motor 103. The moving motor 103 may be understood as the power assisted apparatus. Output parameters of the moving motor 103 in different rotational states may be the same or different. In an example, the moving motor 103 may be integrated in the moving wheel 102. For example, a hub motor integrated in the moving wheel 102 is used as the power assisted apparatus of the walk-behind electric device 100. The walk-behind electric device 100 further includes a functional assembly mounted the device body 101, and the functional assembly includes a functional accessory 107 and a functional motor 108 for driving the functional accessory 107.

In this example, the output parameters of the moving motor 103 may include parameters such as output torque, an output current, an output voltage, output power, a rotational speed, and acceleration.

In this example, the auxiliary operation desired by the user may at least be understood as an operation that the user wants to perform on the walk-behind electric device 100, where the user wants the walk-behind electric device 100 to generate a certain motion change. For example, the auxiliary operation may include at least the magnitude and the direction of the force applied by the user to the walk-behind electric device 100. Forces such as the force or an auxiliary force involved in the present application are all vectors including magnitudes and directions. In an example, the control unit 105 can control a moving speed and a moving direction of the walk-behind electric device 100 according to the identified auxiliary operation. Exemplarily, when the user wants to push the walk-behind electric device 100 to move forward quickly, the desired auxiliary operation may be a relatively large force in a forward direction. In some examples, the auxiliary operation desired by the user may also include a control operation performed for a purpose of stopping the walk-behind electric device 100 from moving. In an example, the auxiliary operation may also include gravity or a component of gravity applied by the user to the walk-behind electric device 100.

The control unit 105 may acquire or extract the device parameters of the walk-behind electric device 100, thereby identifying the auxiliary operation that the user wants to perform. For example, the control unit 105 may identify the auxiliary operation that the user wants to perform according to at least one of a moving parameter of the moving wheel 102, a working parameter of the moving motor 103, or an attitude parameter of the device body 101. The moving parameter may include parameters such as a moving speed and a steering angle of the moving wheel 102. The working parameter may include a rotational speed of the moving motor 103, a rotor position, a working current, a voltage, or reciprocals or integrals of the preceding parameters. The attitude parameter may include parameters such as an attitude angle of the device body 101 and an included angle of a plane where the device body 101 is located relative to a horizontal plane. After identifying the auxiliary operation of the user, the control unit 105 may control the output torque, the rotational speed, or the output power of the moving motor 102. In this example, the control unit 105 may be a hardware device with a control function, such as a microcontroller unit (MCU) or a central processing unit (CPU); and the control unit 105 may also be a non-physical software handler.

In this example, the preceding device parameters may be detected and obtained by a parameter detection unit 106 or the control unit 105. That is to say, the control unit 105 may be integrated with functions such as data detection, analysis processing, and control.

In this example, the auxiliary operation is at least partially positively correlated to at least one output parameter of the moving motor 103. That is to say, the auxiliary operation may be positively correlated to one or more output parameters over a certain period of time. Positive correlation may be understood as the following: in one vector direction, a change trend of one parameter changes with a change trend of another parameter, that is, one parameter becomes larger and another parameter also becomes larger, and vice versa.

In an example, the control unit 105 may identify the magnitude and the direction of the force applied by the user to the walk-behind electric device 100 according to the preceding device parameters and then control the output torque of the moving motor 103. That is to say, the control unit 105 may control the magnitude or the direction of the assistance of the power assisted apparatus according to the force.

In particular, the parameter detection unit 106 in this example does not include a strain gauge that can directly sense, through deformation, the force applied by the user and is also referred to as a pressure sensor. That is to say, no pressure sensor is provided in the walk-behind electric device 100. To control the assistance boost generated by the power assisted boosting apparatus according to the force applied by the user, the control unit 105 needs to estimate or calculate the force applied by the user according to at least one of the preceding device parameters and then change the output torque of the moving motor 103, that is, change the assistance of the power assisted apparatus.

In an example, the output torque of the moving motor 103 is positively correlated to the force applied by the user during a whole process of the user walking with the walk-behind electric device 100 by hand. The force is estimated by the control unit 105 according to the device parameters. Exemplarily, when the estimated force is relatively large, the output torque of the motor is also relatively large, and vice versa. Therefore, a better force balanced state can be achieved so that the user can acquire a more comfortable feeling of following. The force balanced state is explained in detail in the following examples and not described in detail here.

In an example, a power assisted working machine or a walk-behind working machine may include any tool that can be pushed or pulled to move, such as the lawn mower, the snow thrower, a trolley and other tool devices. A lawn mower that can be pushed or pulled by a user is used as an example for detailed description hereinafter.

Figure 25:
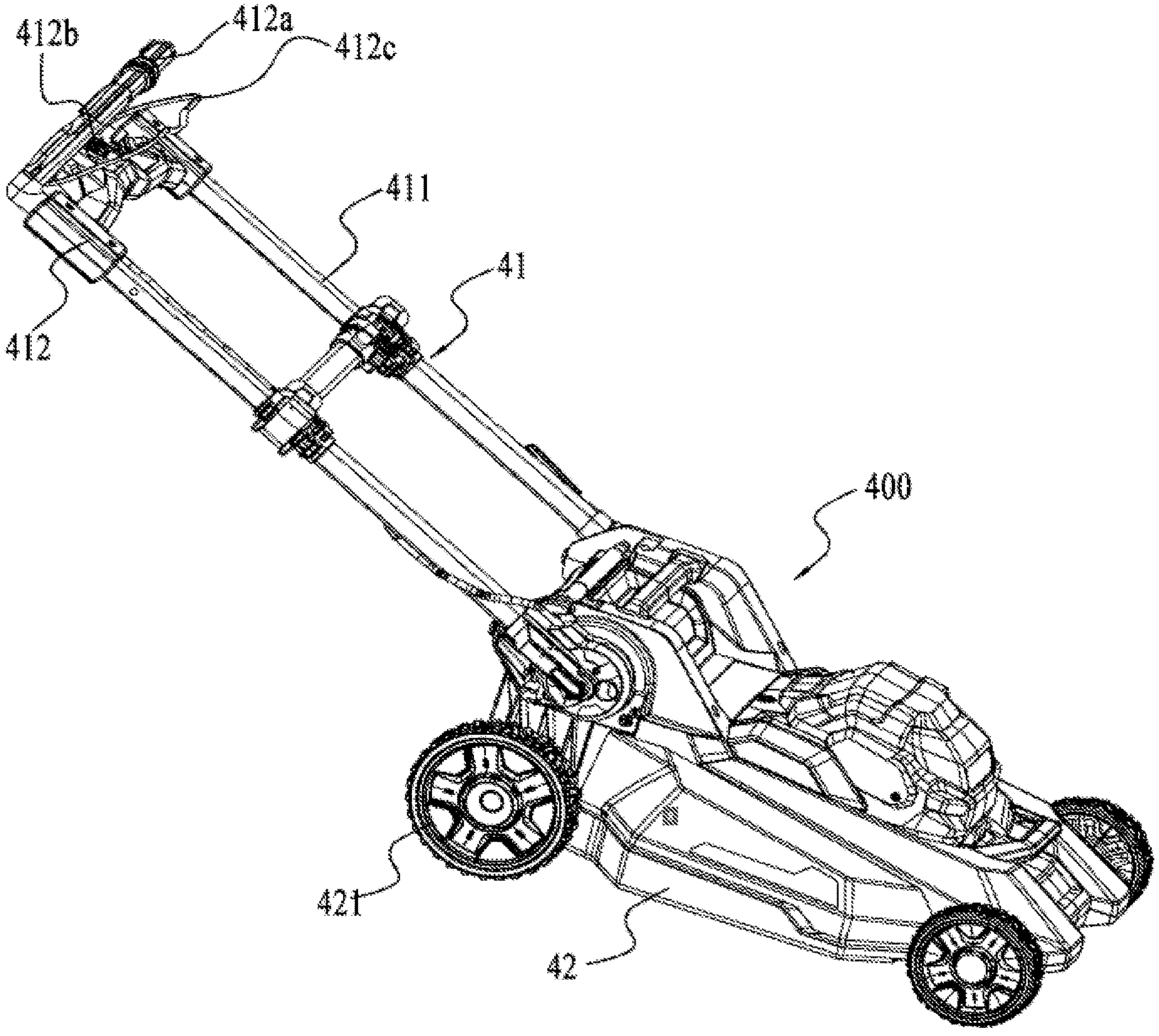
FIG. 25 is a structural view of a walk-behind lawn mower.
Figure 26:
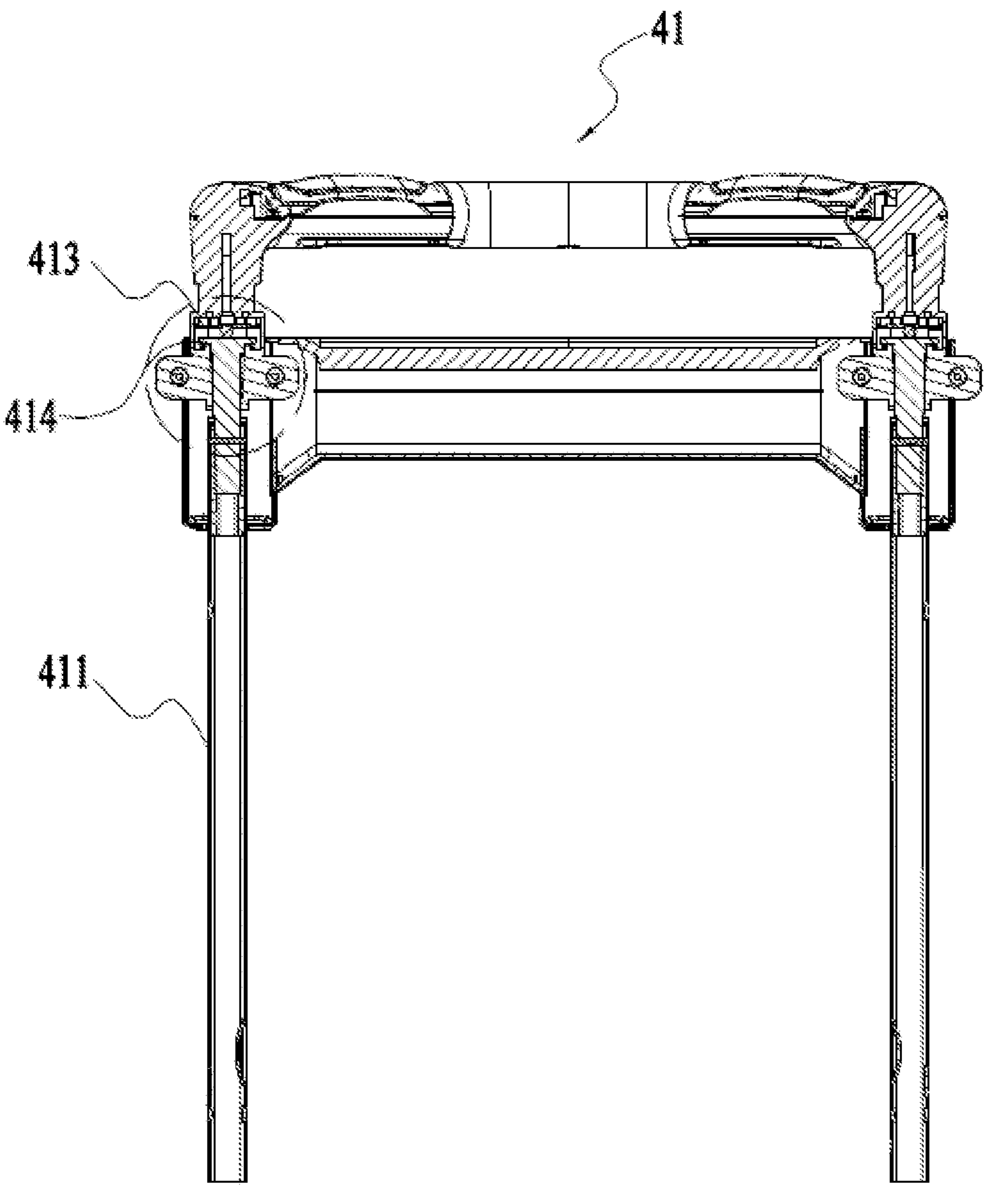
FIG. 26 is a sectional view of part of a handle device of a walk-behind lawn mower with a pressure sensor in a related art.

Referring to FIGS. 25 and 26, a lawn mower 400 mainly includes a handle device 41, a connecting rod 411, an operation piece 412, an operation switch 412*a*, a main body 42, and a moving assembly 421. The main body 42 includes the moving assembly 421 and a power mechanism. The handle device 41 includes the connecting rod 411 and the operation piece 412 that can be held. The operation piece 412 includes a grip for the user to hold and the operation switch 412*a*, the connecting rod 411 may be a hollow long rod structure, and the connecting rod 411 connects the operation piece 412 to the main body 42. The moving assembly 421 is mounted onto the main body 42 and can rotate around a rotation axis so that the entire lawn mower 400 can move on the ground. It is to be understood that the moving assembly 421 is moving wheels of the lawn mower 400.

To achieve a convenient operation of the user and an effort-saving effect, the lawn mower 400 in this example has a self-moving control function. The power mechanism can drive the moving assembly 421 to rotate so as to drive the lawn mower 400 to move on the ground, so that the user does not need to manually push the lawn mower 400 to move completely by a force of the user. Specifically, the power mechanism may be a moving motor 422 which can output a driving force for driving the moving assembly 421 to rotate. In some examples, the handle device 41 of the lawn mower 400 is further integrated with a power button 412*b* and a trigger 412*c*. Exemplarily, the power button 412*b*, the trigger 412*c*, and the operation switch 412*a* of the lawn mower 400 are all integrated on the operation piece 412. In addition, the operation switch 412*a* is not limited to a physical switch or a signal switch, and any device that can control a current in a circuit to be on or off is applicable. In fact, this type of operation switch 412*a* is not limited to current control and may also control the self-moving function to be enabled or disabled by mechanical means.

Generally, in a lawn mower of the prior art, as shown in FIG. 26, to sense a thrust or a pulling force applied by the user to the handle device 41 to control a relevant parameter in a moving process of the lawn mower, such as a moving speed or output torque, a pressure sensor 413 and a trigger assembly 414 for triggering the pressure sensor 413 are generally provided in the handle device 41. The trigger assembly 414 can drive the pressure sensor 413 to deform. In this manner, when the user applies the thrust or the pulling force to the grip 415, the trigger assembly 414 applies a force to the pressure sensor 413, and the pressure sensor 413 is deformed and generates an electrical signal. The lawn mower 400 may further include a signal processing device and a control unit, where the electrical signal generated by the pressure sensor 414 is sent to the signal processing device, the signal processing device sends the processed signal to the control unit, and the control unit controls the lawn mower 400 to move on the ground. However, the electrical signal outputted by the pressure sensor 413 can be transmitted to the main body 42 only through a relatively long communication link; in addition, to accurately sense the force applied by the user, the accuracy of the pressure sensor 413 is required to be relatively high, and after used for a relatively long time, the pressure sensor 413 may have reduced sensitivity for sensing deformation. To sum up, the manner of using the pressure sensor 413 to sense the force applied by the user has a problem of unstable performance or reduced accuracy, affecting the comfort of the user following the lawn mower 400 and controlling the lawn mower 400 to work.

The present application discloses a walk-behind electric device that can accurately calculate the force applied by the user to the handle device 41 of the lawn mower 400 without the aid of the pressure sensor 413. In a specific example, as shown in the control logic diagram in FIG. 27, a control circuit of the main body 42 further includes a parameter detection unit that can acquire the relevant parameter in the moving process of the lawn mower. In an example, the relevant parameter acquired by the parameter detection unit includes at least an electrical parameter of the moving motor 422, such as a phase current or a phase voltage. In an example, the preceding relevant parameter includes at least a moving parameter of the lawn mower 400, such as moving acceleration. In this example, the preceding relevant parameter is not related to the force applied by the user to the handle device 41.

In an example, the parameter detection unit may include a current detection device 424, an acceleration detection device 425, and an angle detection device 426, and the control circuit further includes a power supply 43, a driver circuit 427, and a power conversion circuit 428.

The power supply 43 may be a battery pack or alternating current (AC) mains. Specifically, after converted by the power conversion circuit 428, a power supply voltage can power on the control unit 423, the acceleration detection device 425, and the angle detection device 426. Optionally, each of the control unit 423, the acceleration detection device 425, and the angle detection device 426 may correspond to one power conversion circuit.

Figure 27:
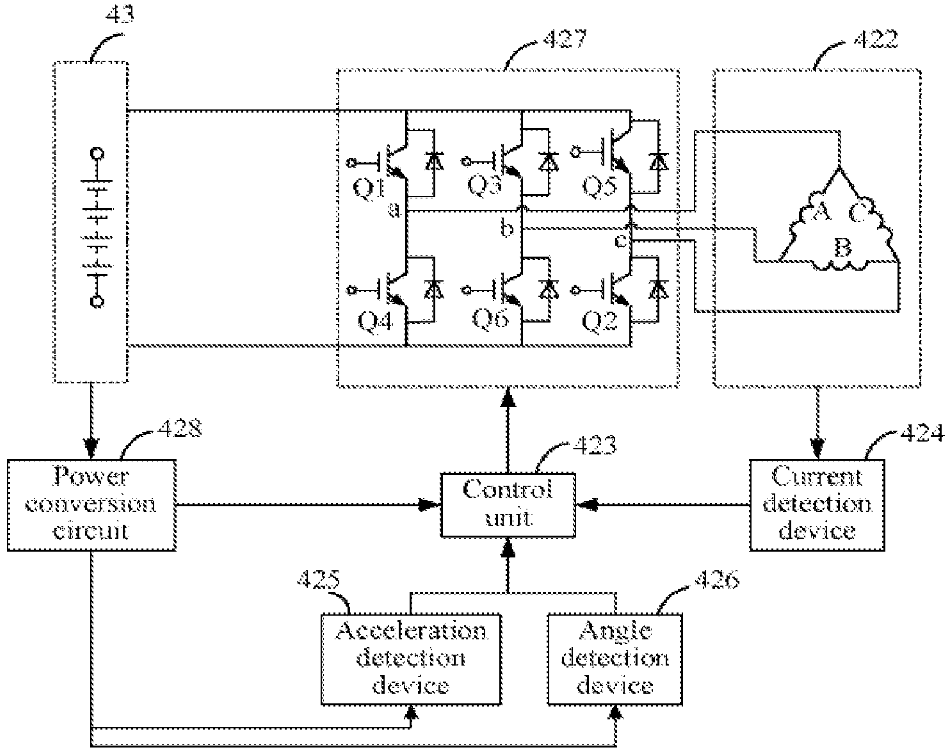
FIG. 27 is a control logic diagram of the walk-behind lawn mower in FIG. 25.

The driver circuit 427 can be connected between the control unit 423 and the moving motor 422 and includes several semiconductor switching elements for switching an energized state of the moving motor 422. In an example, the driver circuit 427 is electrically connected to stator windings of phases of the moving motor 422 and used for transmitting a power supply current to the stator windings to drive the moving motor 422 to rotate. In an example, the moving motor 422 is a brushless motor. As an example, as shown in FIG. 27, the driver circuit 427 includes multiple switching elements Q1, Q2, Q3, Q4, Q5, and Q6. Each gate terminal of the switching elements is electrically connected to the control unit 423 and used for receiving a control signal from the control unit 423. Drains or sources of the switching elements are connected to the stator windings of the moving motor 422. The switching elements Q1 to Q6 receive control signals from the control unit 423 to change respective on states, thereby changing the current loaded on the stator windings of the moving motor 422 by the power supply 43. In an example, the switching elements Q1 to Q6 in the driver circuit 427 may be a three-phase bridge driver circuit including six controllable semiconductor power devices (such as field-effect transistors (FETs), bipolar junction transistors (BJTs), and insulated-gate bipolar transistors (IGBTs)) or any other types of solid-state switches (such as the IGBTs and the BJTs).

The current detection device 424 may be a sampling resistor disposed on a control board of the main body 42 and can collect a working current of the moving motor 422, that is, the phase current. Optionally, the current detection device 424 may be a device for inducing a motor current through a magnetic field. The acceleration detection device 425 is disposed in a housing of the lawn mower 400 or disposed on the handle device 41 or disposed on a moving wheel 421. To ensure the accuracy of acceleration data detection and avoid interference when data is transmitted to the control unit 423, the acceleration detection device 425 is generally disposed in a housing of the main body and relatively close to the control board of the main body, for example, on the moving wheel 421. The acceleration detection device 425 may be an acceleration sensor or any other detection device that can detect the acceleration of the lawn mower. The angle detection device 426 is used for detecting an included angle of a plane on which the lawn mower 400 moves relative to a horizontal plane, for example, an included angle θ shown in FIG. 28. The angle detection device 426 may be an attitude sensor or another detection device that can detect the angle θ. Similarly, to avoid interference to angle data transmitted to the control unit 423, the angle detection device 426 may be disposed at a position relatively close to the control board of the main body.

Figure 28:
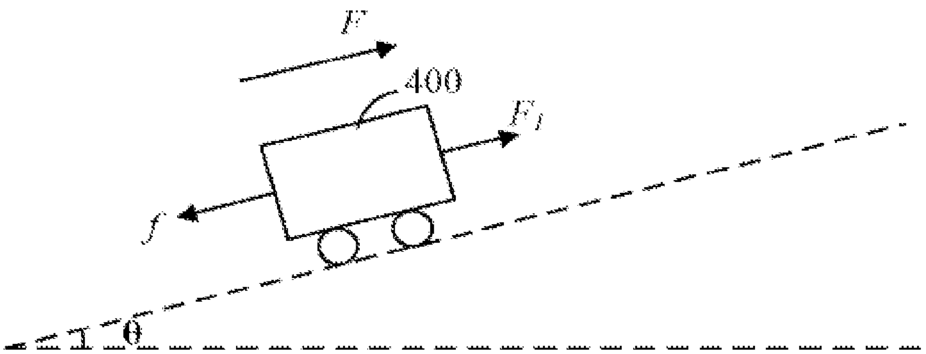
FIG. 28 is a schematic view of a working scenario of a walk-behind lawn mower according to an example of the present application.

In this example, the control unit 423 may calculate output torque of the moving wheel 421 according to the phase current of the moving motor 422 detected by the current detection device 424 and a gear box speed ratio, calculate a friction of the lawn mower 400 relative to the ground according to the angle θ, and calculate the driving force of the lawn mower 400 according to the acceleration and then can calculate the force applied by the user to the handle device 41 according to the output torque, the friction and the driving force. Exemplarily, as shown in FIG. 28, assuming that the mass of the lawn mower 400 is m, the output torque of the moving wheel 421 is M, the driving force of the moving motor 422 is $F_1$ under the output torque M, the included angle of the plane on which the lawn mower 400 moves relative to the horizontal plane is θ, a coefficient of friction of the lawn mower 400 relative to the plane on which the lawn mower 400 moves is $k_f$, and the acceleration of the lawn mower 400 moving on the plane on which the lawn mower 400 moves is a. According to the force analysis of the lawn mower, the force applied by the user to the handle device 41 is:

$$F = ma - F_1 + k_f \times mg \times \cos\theta + mg \times \sin\theta. \tag{6}$$

The force F may include the thrust or the pulling force, and the g is a gravitational acceleration.

In this example, the force applied by the user to the handle device 41 can be calculated without the aid of the pressure sensor and simply through the parameters acquired by several commonly used detection devices disposed on the main body 42 and having stable performance, thereby avoiding interference to data and preventing the control performance of the whole machine from being affected while data collection accuracy is ensured and ensuring that the user can follow the lawn mower 400 more comfortably when the moving state of the lawn mower 400 is controlled based on the force applied by the user.

In an example, the control unit 423 may control a rotational speed of the moving motor 422 according to the thrust of the user such that the moving speed of the lawn mower 400 is consistent with the speed of the user following the lawn mower 400 so that the user follows in a more comfortable state and feels less pulled or hindered.

Figure 29:
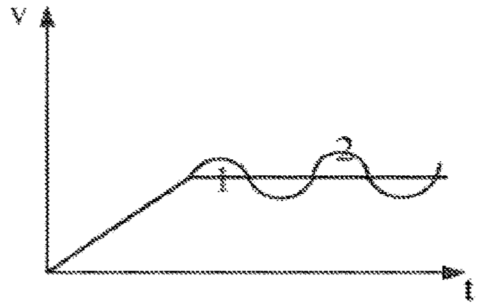
FIG. 29 is a graph illustrating a variation curve of a motor speed when the speed is controlled according to a force applied by a user in the existing art.

In a speed regulation process, it is generally expected to obtain a stable moving speed under an ideal condition shown by line 1 in FIG. 29. However, the acquisition of the moving speed is related to the integration time, for example, the moving speed $v=\int p\,dt$, where p denotes a parameter related to the force applied by the user. That is to say, the moving speed v is related to not only the force applied by the user but also the time. Therefore, when the moving speed of the lawn mower is adjusted based on the force applied by the user, a response in the moving speed has a certain lag. Thus, the moving speed fluctuates significantly as shown by line 2 in FIG. 29 in a later stage of adjustment, that is, a speed lag increases when the force applied by the user is large, and the speed lag decreases when the force applied by the user is small. Therefore, the user may feel pulled or hindered due to the fluctuation of the moving speed of the lawn mower, and the comfort of the user during mowing is relatively poor.

In an example, to further improve the comfort of a control state, the lawn mower 400 can also adaptively adjust the output torque of the moving motor 422 according to the thrust or the pulling force of the user such that the driving force of the motor 422 under the output torque can reach a desired value. It is to be understood that different thrusts or pulling forces correspond to different desired driving forces, the driving force of the lawn mower 400 increases when the force applied by the user is relatively large, and the driving force of the lawn mower 400 decreases when the force applied by the user is relatively small. The driving force of the moving motor 422 is directly adjusted to adaptively change with the force of the user. Since the rotational speed of the moving motor 422 is not directly adjusted, the lag problem of rotational speed adjustment caused by time integration is avoided, and a real-time, efficient, smooth and non-blocking adaptive control process of the driving force of the moving motor 422 is achieved so that the user follows in a more comfortable state. Following in a comfortable state means that the user does not feel pulled or hindered when pushing the lawn mower 400 to work. It is to be noted that when the user follows in a better state, the driving force of the moving motor 422 under current output torque, the force applied by the user, and resistance of the lawn mower 400 in motion can reach a force balanced state within an allowable error range. In the force balanced state, a magnitude of the driving force is positively correlated to a magnitude of the force applied by the user. The force applied by the user to the handle device and calculated by the control unit 423 is F, the control unit 423 adjusts the output torque of the moving motor according to F, the driving force of the moving motor 422 is $F_1$ under the output torque, and the resistance of the lawn mower 400 in motion is $F_2$. When $F+F_1-F_2=F_r=ma$, the preceding three forces are in the force balanced state, where $F_r$ denotes a resultant force received by the lawn mower, m denotes the mass of the lawn mower, and a denotes the moving acceleration of the lawn mower. It is to be understood that, assuming that the force F applied by the user increases, to avoid the user's uncomfortable feeling of strenuous operation due to the application of a relatively large force, the lawn mower 400 increases its own driving force $F_1$ according to the force F so that the increased driving force $F_1$ can overcome the resistance so as to control the lawn mower 400 to continue moving. That is to say, the force balanced state refers to a state in which the force applied by the user is relatively small and the driving force $F_1$ just overcomes the resistance $F_2$ to drive the lawn mower 400 to move.

In an example, to prevent the output torque of the moving motor 422 from being frequently changed and the performance of the lawn mower 400 from being affected, the control unit may determine, according to the magnitude of the force applied by the user to the handle device 41, whether the output torque of the moving motor 422 needs to be changed. That is to say, when the change of the force applied by the user is relatively small, it means that the user operates by hand with no apparent change felt, and the driving force of the moving motor 422 does not need to be changed. However, when a variation of the thrust or the pulling force is greater than or equal to a variation threshold, that is, when the force applied by the user suddenly increases or decreases, the control unit 423 controls the output torque of the moving motor 422 according to the calculated thrust or pulling force so that the driving force of the moving motor 422 under the output torque, the force applied by the user, and the resistance of the lawn mower 400 in motion reach a force balance within an allowable error range.

It is to be understood that in the traditional control manner of adjusting a speed through a switch, when the user toggles a speed regulation switch to a fixed position, the lawn mower 400 moves at a fixed speed. In this case, due to different loads of the lawn mower 400 and different moving speeds of the user, the moving motor 422 may not work in an appropriate current range, resulting in the waste of power. In the present application, magnitudes of a working current may be given according to magnitudes of the force of the user under different working conditions, so as to control the output torque of the moving motor 422 and avoid energy waste caused by working at a fixed working current under a fixed moving speed.

Figure 30:
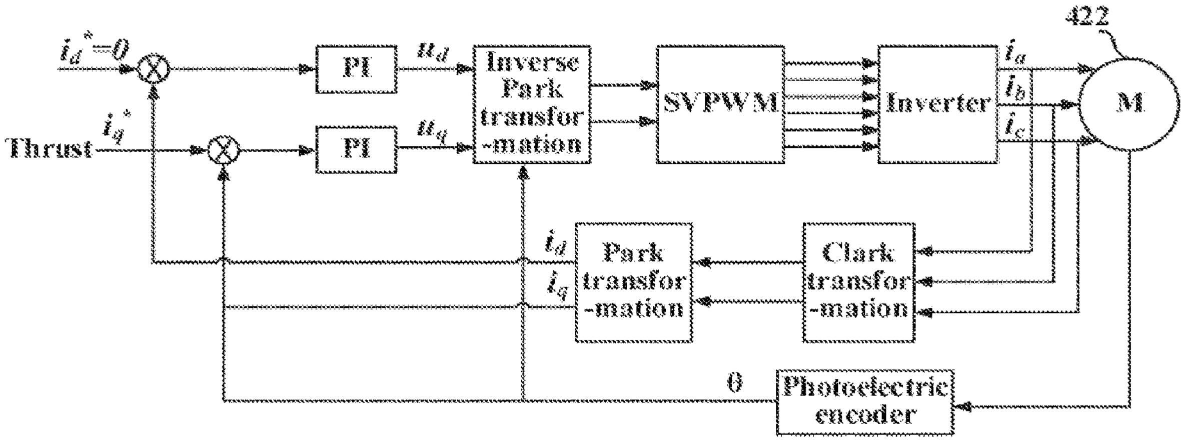
FIG. 30 is a flowchart of a method for whole machine control of the walk-behind lawn mower in FIG. 25.

In an example, the control unit 423 may calculate the corresponding current value according to the calculated magnitude of the thrust and then control the output torque of the moving motor 422 in conjunction with the current value detected by the current detection device so that the driving force of the moving motor 422 can overcome the resistance, allowing the user to perform comfortable following and control with a smaller thrust. As shown in FIG. 30, a current signal corresponding to the force applied by the user may be decomposed into a quadrature-axis current signal $i_q^*$ that affects the output torque of the moving motor 422 and a direct-axis current signal $i_d^*$ that affects a magnetic potential of the moving motor 422. In a specific example, $i_d^*$ is set to zero, and $i_q^*$ is inputted to a field-oriented control (FOC) current loop control circuit as a set current value to act together with the phase current $i_q$ fed back by the moving motor 422 to control the output torque of the moving motor 422. Three-phase currents $i_a$, $i_b$ and $i_c$ fed back by the moving motor 422 in the FOC current loop control circuit are subjected to Clark transformation and Park transformation, so as to obtain the actual quadrature-axis current $i_q$ that can reflect the torque of the moving motor 422 and the actual direct-axis current $i_d$ that can reflect the magnetic potential of the moving motor 422. Since the FOC current loop control circuit is a very mature moving motor control manner, details are not described here.

In this example, the direct-axis current signal $i_d^*$ outputted by the signal processing device is set to zero, and only $i_q^*$ is used as a control electrical signal affecting the output torque of the motor, so as to control the output torque of the motor by the current. It is to be understood that the current signal is positively correlated to the output torque of the moving motor, and the current signal is positively correlated to a force signal reflecting a thrust value or a pulling force value. That is to say, the greater the force applied by the user, the greater the current, and the greater the output torque of the moving motor; and vice versa.

In the present application, the motion control of the lawn mower 400 is achieved by directly using FOC current loop control, simplifying the control manner, reducing the amount of calculation, and improving the response speed and the mowing efficiency of the machine; at the same time, compared with the manner of controlling the rotational speed of the moving motor, the manner of directly controlling the output torque of the moving motor brings a better feeling of actual operation by hand and makes the adjustment process smoother.

Figure 31:
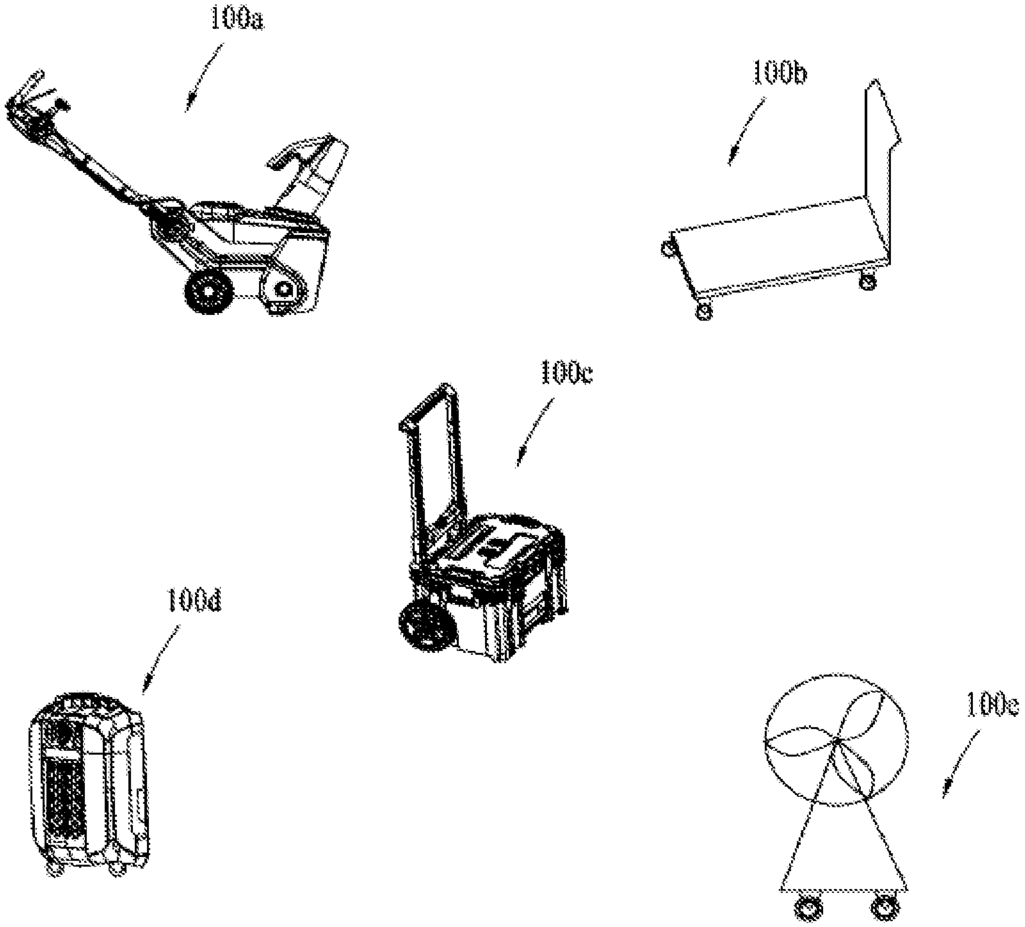
FIG. 31 is a structural view of walk-behind electric devices of other types.

In an example, in addition to the walk-behind lawn mower 400 in the preceding examples, any walk-behind electric device or hand-guided working machine may include other different types of tool devices, for example, the snow thrower, a power assisted wheeled device such as a wheeled multifunctional tool, a power assisted farm device, a wheeled tool bracket, a riding tool device, and an all-terrain vehicle. A snow thrower 100*a*, an item transport device 100*b*, a tool storage device 100*c*, a wheeled power supply device 100*d*, and a wheeled wind power apparatus 100*e* that are shown in FIG. 31 are further included. The item transport device may be a hand-pushing/pulling power assisted cart or forklift. The tool storage device may be a tool storage box and can store different power tools. The wheeled tool bracket may be a bracket for supporting a table-type power tool or a bracket for supporting photovoltaic equipment. The wheeled power supply device may be a large battery pack or a mobile power supply or an adapter or an inverter with wheels. The wheeled wind power apparatus may be a blower or fan with wheels. The power assisted farm device may be a hand-pushing/pulling planter and fertilizer truck. The wheeled multifunctional tool may be a device with wheels that can be pushed or pulled and can be attached with various functional accessories. The riding tool device may reserve a certain amount of power when the power is relatively low or the operation cannot be performed due to other faults, so as to assist the device to move to a destination, such as a charging station. The all-terrain vehicle may be a utility vehicle (UTV) or an all-terrain vehicle (ATV).

For the item transport device 100*b*, the item transport device 100*b* may include an item placement section connected to the device body and configured to consign goods.

For the tool storage device 100*c*, the tool storage device 100*c* may include a box body formed with a storage space for storing at least one type of tool device, a connection rod fixed on the box body and including at least a grip for a user to hold.

For the wheeled tool bracket, the wheeled tool bracket may include a bracket body formed with a support portion configured to support a tool device and a moving wheel connected to the bracket body.

For the wheeled power supply device 100*d*, the wheeled power supply device 100*d* may include a power supply body configured to output power and a moving wheel configured to support the power supply body.

For the wheeled wind power apparatus 100*e*, the wheeled wind power apparatus 100*e* may include an apparatus body including at least a fan and a moving wheel mounted on the apparatus body.

For the wheeled multifunctional tool, the wheeled multifunctional tool may include a tool body and a power portion. The tool body includes an accessory mount configured to mount different functional accessories. The power portion is disposed on the tool body or the different functional accessories and includes a power motor for driving the different functional accessories.

For the power assisted farm device, the power assisted farm device may include a device body, a handle device connected to the device body, and an operation performing assembly mounted onto the device body and used for performing an agricultural operation.

It is to be noted that the above are only preferred examples of the present application and the technical principles used therein. It is to be understood by those skilled in the art that the present application is not limited to the examples described herein. For those skilled in the art, various apparent modifications, adaptations, and substitutions can be made without departing from the scope of the present application. Therefore, while the present application is described in detail in conjunction with the preceding examples, the present application is not limited to the preceding examples and may include equivalent examples without departing from the concept of the present application. The scope of the present application is determined by the scope of the appended claims.

What is claimed is:

1. A power-assisted mower, comprising:

a body comprising a traveling assembly and a drive motor for driving the traveling assembly, and a functional assembly comprising a cutting blade;

a handle device connected to the body and comprising an operating member, wherein the operating member comprises a grip for a user to hold;

a motor parameter detection device configured to detect a rotor position and a working current of the drive motor;

an angle detection device configured to detect an angle of inclination of a workplane of the power-assisted mower relative to a horizontal plane; and a controller configured to estimate a push-pull force applied to the handle device according to the rotor position, the working current, and the angle of inclination, wherein the power-assisted mower does not comprise a sensor capable of directly sensing the push-pull force applied to the handle device.

2. The power-assisted mower of claim 1, wherein the controller is configured to determine a rotational speed of the motor according to the rotor position.

3. The power-assisted mower of claim 2, wherein the controller is configured to establish a thrust observation model according to a current force balance relationship of the mower and use the rotational speed and the working current as input parameters of the thrust observation model to determine the push-pull force.

4. The power-assisted mower of claim 3, wherein the force balance relationship comprises at least the push-pull force, a driving force of the drive motor, resistance of the mower in a current working environment, and a resultant force applied to the mower.

5. The power-assisted mower of claim 4, wherein the controller is configured to establish a relationship model between the working current, the rotational speed, and the resultant force according to the thrust observation model, determine the resultant force according to the working current and the rotational speed, and determine the push-pull force according to a difference between the resultant force and the resistance.

6. The power-assisted mower of claim 4, wherein the resistance comprises at least frictional resistance.

7. The power-assisted mower of claim 6, wherein a coefficient of friction of the frictional resistance is configured not to change with movement of the mower.

8. The power-assisted mower of claim 6, wherein the frictional resistance comprises rolling friction and/or sliding friction.

9. The power-assisted mower of claim 1, wherein a force balance relationship further comprises a self-weight of the mower, and wherein, as mowing is performed and a weight of a grass collecting device of the mower increases, the self-weight is an average value of weights of the mower at different times.

10. The power-assisted mower of claim 1, wherein the mower does not comprise a pressure sensor capable of detecting the push-pull force.

11. The power-assisted mower of claim 1, wherein the motor parameter detection device comprises a Hall sensor.

12. The power-assisted mower of claim 1, wherein the controller is further configured to control a power-assisting state of the drive motor according to the push-pull force.

13. The power-assisted mower of claim 1, wherein the angle detection device comprises an attitude sensor.

14. The power-assisted mower of claim 13, wherein the attitude sensor comprises at least one of a gyroscope, an accelerometer, and a magnetometer.

15. A power-assisted garden tool, comprising:

a body comprising a traveling assembly and a functional assembly;

a handle device connected to the body and used for a user to operate the traveling assembly and/or the functional assembly to work;

a drive motor configured to drive the traveling assembly; and a controller disposed on the body or the handle device and configured to control the drive motor to output a driving force;

wherein the traveling assembly comprises at least drive wheels; and the controller is configured to:

acquire motion information of the drive wheels and identify, based on the motion information, an operating intention of the user operating the handle device; and control the drive motor to work according to the motion information and the operating intention to provide power for the garden tool, wherein the power-assisted garden tool does not comprise a sensor capable of directly sensing, through deformation, a force applied by the user to the handle device.

16. A power-assisted working machine, comprising:

a body comprising a traveling assembly and a drive motor for driving the traveling assembly;

a handle device connected to the body and comprising an operating member, wherein the operating member comprises a grip for a user to hold;

a motor parameter detection device configured to detect a rotor position and a working current of the drive motor;

an accelerometer configured to detect acceleration of the working machine in at least one direction in a current working environment; and a controller configured to determine an angle of inclination of the working machine relative to a horizontal plane according to the acceleration and estimate a push-pull force applied to the handle device according to the rotor position, the working current, and the angle of inclination, wherein the controller is configured to determine a rotational speed of the drive motor according to the rotor position, establish a thrust observation model according to a current force balance relationship of the power-assisted working machine and use the rotational speed and the working current as input parameters of the thrust observation model to determine the push-pull force, wherein the force balance relationship comprises at least the push-pull force, a driving force of the drive motor, resistance of the power-assisted working machine in a current working environment, and a resultant force applied to the power-assisted working machine, and wherein the power-assisted working machine does not comprise a strain gauge capable of directly sensing, through deformation, the push-pull force applied to the handle device.

17. The power-assisted working machine of claim 16, wherein the motor parameter detection device is configured to detect the rotor position and the working current of the drive motor.

18. The power-assisted working machine of claim 16, wherein the controller is configured to determine a rotational speed of the motor according to a rotor position.

19. The power-assisted working machine of claim 16, wherein the controller is configured to use the rotational speed and the working current as input parameters of the thrust observation model to determine the push-pull force.

20. The power-assisted working machine of claim 16, wherein the controller is configured to establish a thrust observation model according to a current force balance relationship of the power-assisted working machine and use a rotational speed and a working current as input parameters of the thrust observation model to determine the push-pull force.

21. A power-assisted working machine, comprising:

a body comprising a traveling wheel set and a drive motor for driving the traveling wheel set;

a handle device connected to the body and comprising a grip for a user to hold;

at least one wheel speed detection device configured to detect a wheel speed of the traveling wheel set;

an angle detection device configured to detect an angle of inclination of a workplane of the power-assisted working machine relative to a horizontal plane; and a controller configured to estimate, according to the wheel speed and the angle of inclination, a push-pull force applied to the handle device and adaptively adjust a power-assisting state of the drive motor according to the push-pull force, wherein the controller is configured to establish a thrust observation model according to a current force balance relationship of the power-assisted working machine and use the wheel speed and a working current of the drive motor as input parameters of the thrust observation model to determine the push-pull force, and wherein the power-assisted working machine does not comprise a strain gauge capable of directly sensing, through deformation, the push-pull force applied to the handle device.

22. A garden tool system, comprising:

a garden tool, wherein the garden tool comprises:

a body comprising at least a traveling assembly;

a handle device connected to the body and used for a user to operate the traveling assembly to work;

a drive motor configured to drive the traveling assembly; and a controller configured to control a state in which the drive motor provides power assistance;

wherein the tool system further comprises:

a first detection device configured to detect a relative state between the garden tool and an operator without detecting a push-pull force applied to the handle device; and a second detection device configured to detect a traveling state of the garden tool;

wherein the controller is configured to:

control the state in which the drive motor provides the power assistance according to the relative state and the traveling state.

* * * * *